(12) United States Patent
Smith et al.

(10) Patent No.: US 11,747,567 B2
(45) Date of Patent: Sep. 5, 2023

(54) QUDIT PAIR GENERATOR

(71) Applicant: Psiquantum, Corp., Palo Alto, CA (US)

(72) Inventors: Jake Smith, Palo Alto, CA (US); Konrad Kieling, Potsdam (DE)

(73) Assignee: Psiquantum, Corp., Palo Alto, CA (US)

( * ) Notice: Subject to any disclaimer, the term of this patent is extended or adjusted under 35 U.S.C. 154(b) by 144 days.

(21) Appl. No.: 17/303,819

(22) Filed: Jun. 8, 2021

(65) Prior Publication Data

US 2022/0171133 A1    Jun. 2, 2022

Related U.S. Application Data

(60) Provisional application No. 63/119,411, filed on Nov. 30, 2020.

(51) Int. Cl.
| | | |
|---|---|---|
| *G02B 6/293* | (2006.01) | |
| *G06N 10/00* | (2022.01) | |
| *G06F 17/14* | (2006.01) | |

(52) U.S. Cl.
CPC ....... *G02B 6/29395* (2013.01); *G02B 6/2935* (2013.01); *G06N 10/00* (2019.01); *G06F 17/141* (2013.01)

(58) Field of Classification Search
CPC ........ G06N 10/00; G06N 10/60; G06N 10/20; G06N 10/70; G02B 6/2935; G02B 6/29395; G06F 17/141
See application file for complete search history.

(56) References Cited

U.S. PATENT DOCUMENTS

| | | | |
|---|---|---|---|
| 11,126,062 B1 | 9/2021 | Kieling et al. | |
| 2017/0018312 A1 | 1/2017 | Benjamin et al. | |
| 2019/0266512 A1 | 8/2019 | Shen et al. | |
| 2020/0287631 A1 | 9/2020 | Gimeno-Segovia et al. | |
| 2021/0232963 A1* | 7/2021 | Gimeno-Segovia ... | G06N 10/40 |
| 2021/0304053 A1* | 9/2021 | Pant .......................... | G06N 3/08 |
| 2021/0325924 A1* | 10/2021 | Cable ................. | G02B 6/12016 |
| 2022/0004075 A1* | 1/2022 | Cable .................. | H04Q 11/0005 |
| 2022/0156625 A1* | 5/2022 | Pant ........................ | G06N 10/20 |

FOREIGN PATENT DOCUMENTS

| | | | | |
|---|---|---|---|---|
| WO | WO-2020056324 A1 * | 3/2020 | ............. | B82Y 10/00 |
| WO | WO-2020257772 A1 * | 12/2020 | ............. | G06N 10/00 |

OTHER PUBLICATIONS

Bergmann, et al., "A Hybrid Quantum Repeater for Qudits", Available online at:https://arxiv.org/pdf/1708.09322v1.pdf, Aug. 2017, 23 pages.

(Continued)

*Primary Examiner* — Thomas A Hollweg
*Assistant Examiner* — Mary A El-Shammaa
(74) *Attorney, Agent, or Firm* — KILPATRICK TOWNSEND & STOCKTON LLP

(57) ABSTRACT

Circuits for generating a pair of qudits in a maximally entangled state and methods of operating such circuits are disclosed. The circuits can be photonic circuits that use a combination of beam splitters, phase shifters, and detectors to produce an entangled pair of d-dimensional qudits from an input set of 4d photons. In a case where d equals 2, a pair of qubits in a Bell state can be generated.

15 Claims, 13 Drawing Sheets

(56) References Cited

OTHER PUBLICATIONS

PCT/US2021/060111, "International Search Report and Written Opinion", dated Aug. 24, 2022, 10 pages.
Yoshikawa, et al., "Heralded Creation of Photonic Qudits From Parametric Down Conversion Using Linear Optics", Available online at :https://arxiv.org/pdf/1710.08906v1.pdf, Oct. 2017, 11 pages.

* cited by examiner

| Detection Pattern | Δ1 | Δ2 | Δ3 |
|---|---|---|---|
| b1, b2, b3 all even | Off | Off | Off |
| b1 even; b2, b3 odd | On | Off | On |
| b1, b3 odd; b2 even | Off | On | On |
| b1, b2 odd; b3 even | On | On | Off |

*FIG. 14*

QUDIT PAIR GENERATOR

CROSS-REFERENCE TO RELATED APPLICATION

This application claims the benefit of U.S. Provisional Application No. 63/119,411, filed Nov. 30, 2020, the disclosure of which is incorporated by reference herein.

BACKGROUND

Quantum computing can be distinguished from "classical" computing by its reliance on structures referred to as "qubits." At the most general level, a qubit is a quantum system that can exist in one of two orthogonal states (denoted as $|0\rangle$ and $|1\rangle$ in the conventional bra/ket notation) or in a superposition of the two states $$\left(\text{e.g., } \frac{1}{\sqrt{2}}(|0\rangle + |1\rangle)\right).$$

By operating on a system (or ensemble) of qubits, a quantum computer can quickly perform certain categories of computations that would require impractical amounts of time in a classical computer.

One of the main barriers to widespread use of quantum technologies, such as quantum computing, quantum communications, and the like, is the ability to reliably generate entanglement among two or more physical quantum systems, e.g., between two or more qubits. However, various problems that either inhibit the generation of entangled states or destroy the entanglement once created (e.g., such as decoherence) have frustrated advancements in quantum technologies that rely on the use of highly entangled quantum states. Furthermore, in some qubit architectures, e.g., photonic architectures, the generation of entangled states of multiple qubits is an inherently probabilistic process that may have a low probability of success. For example, current methods for producing Bell states from single photons have success probabilities of around 20% (corresponding to an 80% failure rate). Accordingly, there remains a need for improved systems and methods for producing entangled states.

SUMMARY

Certain embodiments described herein relate to a circuit that can comprise: a first set of waveguides and a second set of waveguides; a first set of mode couplers that couples waveguides in the first set of waveguides to waveguides in the second set of waveguides; a mode coupler network coupled to the waveguides of the second set of waveguides and having a plurality of outputs that are coupled to a plurality of photon detectors; a set of reconfigurable phase shifters, each reconfigurable phase shifter coupled to a different one of the waveguides in the first set of waveguides; and a classical control logic circuit coupled to outputs of the plurality of photon detectors and configured to determine, based on measurements by the plurality of photon detectors, whether generation of a qudit pair succeeded or failed and further configured to determine, based on the measurements by the plurality of photon detectors, a phase shift configuration for each of the reconfigurable phase shifters.

In various embodiments, the circuit can also comprise a second set of mode couplers, wherein each mode coupler in the second set is coupled between a different pair of waveguides in the first set of waveguides downstream of the reconfigurable phase shifters.

In various embodiments, the circuit can also comprise a photon source configured to propagate a single photon into each of the waveguides in the first set of waveguides and the second set of waveguides.

In various embodiments, each of the mode couplers in the first set of mode couplers can comprise a 50/50 beam splitter.

In various embodiments, the mode coupler network can implement a discrete Fourier transform or a Hadamard transfer matrix or any other mode information erasure operation.

Certain embodiments described herein relate to a circuit that can comprise: a first set of waveguides and a second set of waveguides, wherein each of the first set of waveguides and the second set of waveguides includes a number n=2d of waveguides; a first set of mode couplers, wherein each mode coupler in the first set is coupled between one of the waveguides in the first set of waveguides and one of the waveguides in the second set of waveguides; a mode information erasure (MIE) circuit coupled to the waveguides of the second set of waveguides downstream of the first set of mode couplers; a set of n photon detectors coupled to outputs of the MIE circuit, each of the n photon detectors being configured to count a number of detected photons; a set of reconfigurable phase shifters, each reconfigurable phase shifter coupled to a different one of the waveguides in the first set of waveguides; a second set of mode couplers, wherein each mode coupler in the second set is coupled between a different pair of waveguides in the first set of waveguides downstream of the reconfigurable phase shifters; and a classical control logic circuit coupled to outputs of set of n photon detectors and configured to determine, based on a total count of photons counted by the n photon detectors, whether generation of a qudit pair succeeded or failed and further configured to determine, based on a pattern of photons counted by each of the n photon detectors, a phase shift configuration for each of the reconfigurable phase shifters.

In various embodiments, the circuit can also comprise a photon source configured to propagate a single photon into each of the waveguides in the first set of waveguides and the second set of waveguides.

In various embodiments, the MIE circuit can includes a network of beam splitters configured to apply a Hadamard transfer matrix or a discrete Fourier transform or any other mode information erasure transform.

In various embodiments, each of the mode couplers in the first set of mode couplers can comprise a 50/50 beam splitter.

In various embodiments, each of the mode couplers in the second set of mode couplers can comprise a 50/50 beam splitter.

In various embodiments, in the event that the classical control logic circuit determines that generation of a qudit pair succeeded, outputs of the second set of mode couplers can be interpreted as corresponding to an entangled pair of qudits encoding d bits of information.

In various embodiments, the set of reconfigurable phase shifters can include n reconfigurable phase shifters or n−1 reconfigurable phase shifters.

Certain embodiments described herein relate to a circuit that can comprise: a first set of four waveguides and a second set of four waveguides; a first set of mode couplers, wherein each mode coupler in the first set is coupled between one of the waveguides in the first set of waveguides and one of the waveguides in the second set of waveguides; a mode information erasure (MIE) circuit coupled to the waveguides of the second set of waveguides and operating after the first set of mode couplers; a set of photon detectors coupled to outputs of the mode information erasure circuit, each of the photon detectors being configured to count a number of detected photons; a set of reconfigurable phase shifters, each reconfigurable phase shifter coupled to a different one of the waveguides in the first set of waveguides; and a classical control logic circuit coupled to outputs of set of photon detectors and configured to determine, based on a total count of photons counted by the photon detectors, whether generation of a Bell pair succeeded or failed and further configured to determine, based on a pattern of photons counted by each of the photon detectors, a phase shift configuration for each of the reconfigurable phase shifters.

In various embodiments, the circuit can also comprise a second set of mode couplers, wherein each mode coupler in the second set is coupled between a different pair of waveguides in the first set of waveguides downstream of the reconfigurable phase shifters.

In various embodiments, each of the reconfigurable phase shifters can have a first state that applies a phase shift and a second state that applies no phase shift. The phase shift applied in the first state can be, for example, $e^{i\pi/2}$. In various embodiments, the classical control logic circuit can be further configured to determine the state for each of the reconfigurable phase shifters based on sums of photon counts across different subsets of the detectors. For example, the classical control logic circuit can be further configured to determine the state for each of the reconfigurable phase shifters based on evenness or oddness of the sums.

The following detailed description, together with the accompanying drawings, will provide a better understanding of the nature and advantages of the claimed invention.

BRIEF DESCRIPTION OF THE DRAWINGS

FIG. 14 shows an example of a lookup table that can be used according to some embodiments.

DETAILED DESCRIPTION

Figure 1:
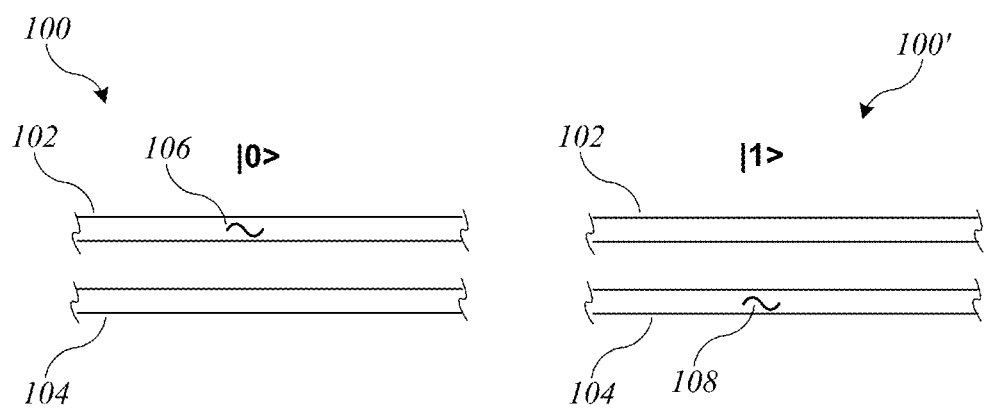
FIG. 1 shows two representations of a portion of a pair of waveguides corresponding to a dual-rail-encoded photonic qubit.

Disclosed herein are examples (also referred to as "embodiments") of systems and methods for creating qubits and superposition states (including entangled states) of qudits based on various physical quantum systems, including photonic systems. Such embodiments can be used, for example, in quantum computing as well as in other contexts (e.g., quantum communication) that exploit quantum entanglement. As used herein, a qudit can be any quantum system having a quantum state space that can be modeled as a (complex) d-dimensional vector space (for any integer d), which can be used to encode two or more bits of information. In the case where d=2, a qudit can be referred to as a "qubit."

To facilitate understanding of the disclosure, an overview of relevant concepts and terminology is provided in Section 1. With this context established, Section 2 describes examples of quantum circuits that generate qudit pairs. Such circuits can be implemented, for example, using linear optical components. Although embodiments are described with specific detail to facilitate understanding, those skilled in the art with access to this disclosure will appreciate that the claimed invention can be practiced without these details.

1. Overview of Quantum Computing

Quantum computing relies on the dynamics of quantum objects, e.g., photons, electrons, atoms, ions, molecules, nanostructures, and the like, which follow the rules of quantum theory. In quantum theory, the quantum state of a quantum object is described by a set of physical properties, the complete set of which is referred to as a mode. In some embodiments, a mode is defined by specifying the value (or distribution of values) of one or more properties of the quantum object. For example, in the case where the quantum object is a photon, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, the orbital angular momentum state of the photon, and the like.

For the case of photons propagating in a waveguide, it is convenient to express the state of the photon as one of a set of discrete spatio-temporal modes. For example, the spatial mode $k_j$ of the photon is determined according to which one of a finite set of discrete waveguides the photon is propagating in, and the temporal mode $t_j$ is determined by which one of a set of discrete time periods (referred to herein as "bins") the photon is present in. In some photonic implementations, the degree of temporal discretization can be provided by a pulsed laser which is responsible for generating the photons. In examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Further, in the description that follows, embodiments will be described that employ photonic waveguides to define the spatial modes of the photon. However, persons of ordinary skill in the art with access to this disclosure will appreciate that other types of mode, e.g., temporal modes, energy states, and the like, can be used without departing from the scope of the present disclosure. In addition, persons of ordinary skill in the art will be able to implement examples using other types of quantum systems, including but not limited to other types of photonic systems.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. For example, a multimode, two particle Fock state $|1001\rangle_{1,2,3,4}$ specifies a two-particle quantum state with one particle in mode 1, zero particles in mode 2, zero particles in mode 3, and one particle in mode 4. Again, as introduced above, a mode can be any property of the quantum object. For the case of a photon, any two modes of the electromagnetic field can be used, e.g., one may design the system to use modes that are related to a degree of freedom that can be manipulated passively with linear optics. For example, polarization, spatial degree of freedom, or angular momentum could be used. The four-mode system represented by the two particle Fock state $|1001\rangle_{1,2,3,4}$ can be physically implemented as four distinct waveguides with two of the four waveguides having one photon travelling within them. Other examples of a state of such a many-body quantum system include the four-particle Fock state $|1111\rangle_{1,2,3,4}$ that represents each mode occupied by one particle and the four-particle Fock state $|2200\rangle_{1,2,3,4}$ that represents modes 1 and 2 respectively occupied by two particles and modes 3 and 4 occupied by zero particles. For modes having zero particles present, the term "vacuum mode" is used. For example, for the four-particle Fock state $|2200\rangle_{1,2,3,4}$ modes 3 and 4 are referred to herein as "vacuum modes." Fock states having a single occupied mode can be represented in shorthand using a subscript to identify the occupied mode. For example, $|0010\rangle_{1,2,3,4}$ is equivalent to $|1_3\rangle$.

1.1. Qubits

As used herein, a "qubit" (or quantum bit) is a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used in this section, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of molecules, atoms, ions, nuclei, or photons. Other examples include other engineered quantum systems such as flux qubits, phase qubits, or charge qubits (e.g., formed from a superconducting Josephson junction); topological qubits (e.g., Majorana fermions); or spin qubits formed from vacancy centers (e.g., nitrogen vacancies in diamond).

A qubit can be "dual-rail encoded" such that the logical value of the qubit is encoded by occupation of one of two modes of the quantum system. For example, the logical 0 and 1 values can be encoded as follows:

$$|0\rangle_L = |10\rangle_{1,2} \tag{1}$$

$$|1\rangle_L = |01\rangle_{1,2} \tag{2}$$

where the subscript "L" indicates that the ket represents a logical state (e.g., a qubit value) and, as before, the notation $|ij\rangle_{1,2}$ on the right-hand side of the equations above indicates that there are i particles in a first mode and j particles in a second mode, respectively (e.g., where i and j are integers). In this notation, a two-qubit system having a logical state $|0\rangle|1\rangle_L$ (representing a state of two qubits, the first qubit being in a '0' logical state and the second qubit being in a '1' logical state) may be represented using occupancy across four modes by $|1001\rangle_{1,2,3,4}$ (e.g., in a photonic system, one photon in a first waveguide, zero photons in a second waveguide, zero photons in a third waveguide, and one photon in a fourth waveguide). In some instances throughout this disclosure, the various subscripts are omitted to avoid unnecessary mathematical clutter.

1.2. Entangled States

Many of the advantages of quantum computing relative to "classical" computing (e.g., conventional digital computers using binary logic) stem from the ability to create entangled states of multi-qubit systems. In mathematical terms, a state $|\psi\rangle$ of n quantum objects is a separable state if $|\psi\rangle = |\psi_1\rangle \otimes \ldots \otimes |\psi_n\rangle$, and an entangled state is a state that is not separable. One example is a Bell state, which, loosely speaking, is a type of maximally entangled state for a two-qubit system, and qubits in a Bell state may be referred to as a Bell pair. For example, for qubits encoded by single photons in pairs of modes (a dual-rail encoding), examples of Bell states include:

$$|\Phi^+\rangle = \frac{|0\rangle_L|0\rangle_L + |1\rangle_L|1\rangle_L}{\sqrt{2}} = \frac{|10\rangle|10\rangle + |01\rangle|01\rangle}{\sqrt{2}} \quad (3)$$

$$|\Phi^-\rangle = \frac{|0\rangle_L|0\rangle_L - |1\rangle_L|1\rangle_L}{\sqrt{2}} = \frac{|10\rangle|10\rangle - |01\rangle|01\rangle}{\sqrt{2}} \quad (4)$$

$$|\Psi^+\rangle = \frac{|0\rangle_L|1\rangle_L + |1\rangle_L|0\rangle_L}{\sqrt{2}} = \frac{|10\rangle|01\rangle + |01\rangle|10\rangle}{\sqrt{2}} \quad (5)$$

$$|\Psi^-\rangle = \frac{|0\rangle_L|1\rangle_L - |1\rangle_L|0\rangle_L}{\sqrt{2}} = \frac{|10\rangle|01\rangle - |01\rangle|10\rangle}{\sqrt{2}} \quad (6)$$

More generally, an n-qubit Greenberger-Horne-Zeilinger (GHZ) state (or "n-GHZ state") is an entangled quantum state of n qubits. For a given orthonormal logical basis, an n-GHZ state is a quantum superposition of all qubits being in a first basis state superposed with all qubits being in a second basis state:

$$|GHZ\rangle = \frac{|0\rangle^{\otimes M} + |1\rangle^{\otimes M}}{\sqrt{2}} \quad (7)$$

where the kets above refer to the logical basis. For example, for qubits encoded by single photons in pairs of modes (a dual-rail encoding), a 3-GHZ state can be written:

$$|GHZ\rangle = \frac{|0\rangle_L|0\rangle_L|0\rangle_L - |1\rangle_L|1\rangle_L|1\rangle_L}{\sqrt{2}} \quad (8)$$
$$= \frac{|10\rangle|10\rangle|10\rangle + |01\rangle|01\rangle|01\rangle}{\sqrt{2}}$$

where the kets above refer to photon occupation number in six respective modes (with mode subscripts omitted).

1.3. Physical Implementations

Qubits (and operations on qubits) can be implemented using a variety of physical systems. In some examples described herein, qubits are provided in an integrated photonic system employing waveguides, beam splitters, photonic switches, and single photon detectors, and the modes that can be occupied by photons are spatiotemporal modes that correspond to presence of a photon in a waveguide. Modes can be coupled using mode couplers, e.g., optical beam splitters, to implement transformation operations, and measurement operations can be implemented by coupling single-photon detectors to specific waveguides. One of ordinary skill in the art with access to this disclosure will appreciate that modes defined by any appropriate set of degrees of freedom, e.g., polarization modes, temporal modes, and the like, can be used without departing from the scope of the present disclosure. For instance, for modes that only differ in polarization (e.g., horizontal (H) and vertical (V)), a mode coupler can be any optical element that coherently rotates polarization, e.g., a birefringent material such as a waveplate. For other systems such as ion trap systems or neutral atom systems, a mode coupler can be any physical mechanism that can couple two modes, e.g., a pulsed electromagnetic field that is tuned to couple two internal states of the atom/ion.

In some embodiments of a photonic quantum computing system using dual-rail encoding, a qubit can be implemented using a pair of waveguides. FIG. 1 shows two representations (100, 100') of a portion of a pair of waveguides 102, 104 that can be used to provide a dual-rail-encoded photonic qubit. At 100, a photon 106 is in waveguide 102 and no photon is in waveguide 104 (also referred to as a vacuum mode); in some embodiments, this corresponds to the $|0\rangle_L$ state of a photonic qubit. At 100', a photon 108 is in waveguide 104, and no photon is in waveguide 102; in some embodiments this corresponds to the $|1\rangle_L$ state of the photonic qubit. To prepare a photonic qubit in a known logical state, a photon source (not shown) can be coupled to one end of one of the waveguides. The photon source can be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system can be created in the same pair of waveguides. In addition, by providing multiple pairs of waveguides, a quantum system having qubits whose logical states correspond to different spatiotemporal modes can be created. It should be understood that the waveguides in such a system need not have any particular spatial relationship to each other. For instance, they can be but need not be arranged in parallel.

Occupied modes can be created by using a photon source to generate a photon that then propagates in the desired waveguide. A photon source can be, for instance, a resonator-based source that emits photon pairs, also referred to as a heralded single photon source. In one example of such a source, the source is driven by a pump, e.g., a light pulse, that is coupled into a system of optical resonators that, through a nonlinear optical process (e.g., spontaneous four wave mixing (SFWM), spontaneous parametric down-conversion (SPDC), second harmonic generation, or the like), can generate a pair of photons. Many different types of photon sources can be employed. Examples of photon pair sources can include a microring-based spontaneous four wave mixing (SPFW) heralded photon source (HPS). However, the precise type of photon source used is not critical and any type of nonlinear source, employing any process, such as SPFW, SPDC, or any other process can be used. Other classes of sources that do not necessarily require a nonlinear material can also be employed, such as those that employ atomic and/or artificial atomic systems, e.g., quantum dot sources, color centers in crystals, and the like. In some cases, sources may or may not be coupled to photonic cavities, e.g., as can be the case for artificial atomic systems such as quantum dots coupled to cavities. Other types of photon sources also exist for SPWM and SPDC, such as optomechanical systems and the like.

In such cases, operation of the photon source may be non-deterministic (also sometimes referred to as "stochastic") such that a given pump pulse may or may not produce a photon pair. In some embodiments, coherent spatial and/or temporal multiplexing of several non-deterministic sources (referred to herein as "active" multiplexing) can be used to allow the probability of having one mode become occupied during a given cycle to approach 1. One of ordinary skill will appreciate that many different active multiplexing architectures that incorporate spatial and/or temporal multiplexing are possible. For instance, active multiplexing schemes that employ log-tree, generalized Mach-Zehnder interferometers, multimode interferometers, chained sources, chained sources with dump-the-pump schemes, asymmetric multi-crystal single photon sources, or any other type of active multiplexing architecture can be used. In some embodiments, the photon source can employ an active multiplexing scheme with quantum feedback control and the like.

Measurement operations can be implemented by coupling a waveguide to a single-photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode.

Some embodiments described below relate to physical implementations of unitary transform operations that couple modes of a quantum system, which can be understood as transforming the quantum state of the system. For instance, if the initial state of the quantum system (prior to mode coupling) is one in which one mode is occupied with probability 1 and another mode is unoccupied with probability 1 (e.g., a state $|10\rangle$ in the Fock notation introduced above), mode coupling can result in a state in which both modes have a nonzero probability of being occupied, e.g., a state $a_1|10\rangle + a_2|01\rangle$, where $|a_1|^2+|a_2|^2=1$. In some embodiments, operations of this kind can be implemented by using beam splitters to couple modes together and variable phase shifters to apply phase shifts to one or more modes. The amplitudes $a_1$ and $a_2$ depend on the reflectivity (or transmissivity) of the beam splitters and on any phase shifts that are introduced.

Figure 2A:
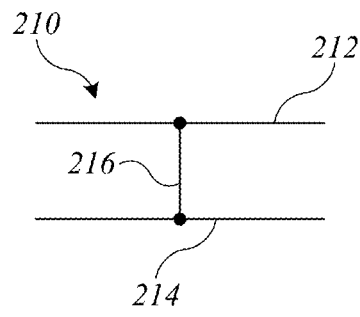
FIG. 2A shows a schematic diagram for coupling of two modes.

FIG. 2A shows a schematic diagram 210 (also referred to as a circuit diagram or circuit notation) for coupling of two modes. The modes are drawn as horizontal lines 212, 214, and the mode coupler 216 is indicated by a vertical line that is terminated with nodes (solid dots) to identify the modes being coupled. In the more specific language of linear quantum optics, the mode coupler 216 shown in FIG. 2A represents a 50/50 beam splitter that implements a transfer matrix:

$$T = \frac{1}{\sqrt{2}}\begin{pmatrix} 1 & i \\ i & 1 \end{pmatrix}, \quad (9)$$

where T defines the linear map for the photon creation operators on two modes. (In certain contexts, transfer matrix T can be understood as implementing a first-order imaginary Hadamard transform.) By convention the first column of the transfer matrix corresponds to creation operators on the top mode (referred to herein as mode 1, labeled as horizontal line 212), and the second column corresponds to creation operators on the second mode (referred to herein as mode 2, labeled as horizontal line 214), and so on if the system includes more than two modes. More explicitly, the mapping can be written as:

$$\begin{pmatrix} a_1^\dagger \\ a_2^\dagger \end{pmatrix}_{input} \mapsto \frac{1}{\sqrt{2}} \begin{pmatrix} 1 & -i \\ -i & 1 \end{pmatrix} \begin{pmatrix} a_1^\dagger \\ a_2^\dagger \end{pmatrix}_{output}, \quad (10)$$

where subscripts on the creation operators indicate the mode that is operated on, the subscripts input and output identify the form of the creation operators before and after the beam splitter, respectively and where:

$$a_i|n_i,n_j\rangle = \sqrt{n_i}|n_i-1,n_j\rangle$$
$$a_j|n_i,n_j\rangle = \sqrt{n_j}|n_i,n_j-1\rangle$$
$$a_j^\dagger|n_i,n_j\rangle = \sqrt{n_j+1}|n_i,n_j+1\rangle \quad (11)$$

For example, the application of the mode coupler shown in FIG. 2A leads to the following mappings:

$$a_{1_{input}}^\dagger \mapsto \frac{1}{\sqrt{2}}(a_{1_{output}}^\dagger - ia_{2_{output}}^\dagger) \quad (12)$$

$$a_{2_{input}}^\dagger \mapsto \frac{1}{\sqrt{2}}(-ia_{1_{output}}^\dagger + a_{2_{output}}^\dagger)$$

Thus, the action of the mode coupler described by Eq. (9) is to take the input states $|10\rangle$, $|01\rangle$, and $|11\rangle$ to $$|10\rangle \mapsto \frac{|10\rangle - i|01\rangle}{\sqrt{2}} \quad (13)$$

$$|01\rangle \mapsto \frac{-i|10\rangle + |01\rangle}{\sqrt{2}}$$

$$|11\rangle \mapsto \frac{-i}{2}(|20\rangle + |02\rangle)$$

Figure 2B:
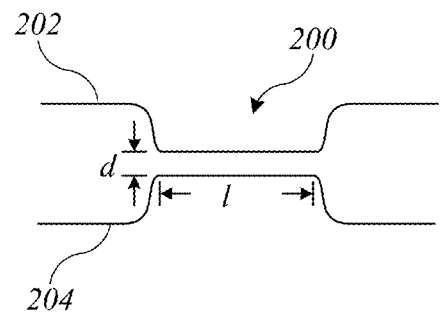
FIG. 2B shows, in schematic form, a physical implementation of mode coupling in a photonic system that can be used in some embodiments.

FIG. 2B shows a physical implementation of a mode coupling that implements the transfer matrix T of Eq. (9) for two photonic modes in accordance with some embodiments. In this example, the mode coupling is implemented using a waveguide beam splitter 200, also sometimes referred to as a directional coupler or mode coupler. Waveguide beam splitter 200 can be realized by bringing two waveguides 202, 204 into close enough proximity that the evanescent field of one waveguide can couple into the other. By adjusting the separation d between waveguides 202, 204 and/or the length l of the coupling region, different couplings between modes can be obtained. In this manner, a waveguide beam splitter 200 can be configured to have a desired transmissivity. For example, the beam splitter can be engineered to have a transmissivity equal to 0.5 (i.e., a 50/50 beam splitter for implementing the specific form of the transfer matrix T introduced above). If other transfer matrices are desired, the reflectivity (or the transmissivity) can be engineered to be greater than 0.6, greater than 0.7, greater than 0.8, or greater than 0.9 without departing from the scope of the present disclosure.

In addition to mode coupling, some unitary transforms may involve phase shifts applied to one or more modes. In some photonic implementations, variable phase-shifters can be implemented in integrated circuits, providing control over the relative phases of the state of a photon spread over multiple modes. Examples of transfer matrices that define such a phase shifts are given by (for applying a +i and −i phase shift to the second mode, respectively):

$$s = \begin{pmatrix} 1 & 0 \\ 0 & i \end{pmatrix} \quad (14)$$

$$s^\dagger = \begin{pmatrix} 1 & 0 \\ 0 & -i \end{pmatrix}$$

For silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide by an amount of the order of $10^{-5}$ K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, BBO, KTP, and the like and even doped semiconductors such as silicon, germanium, and the like.

Figure 3A:
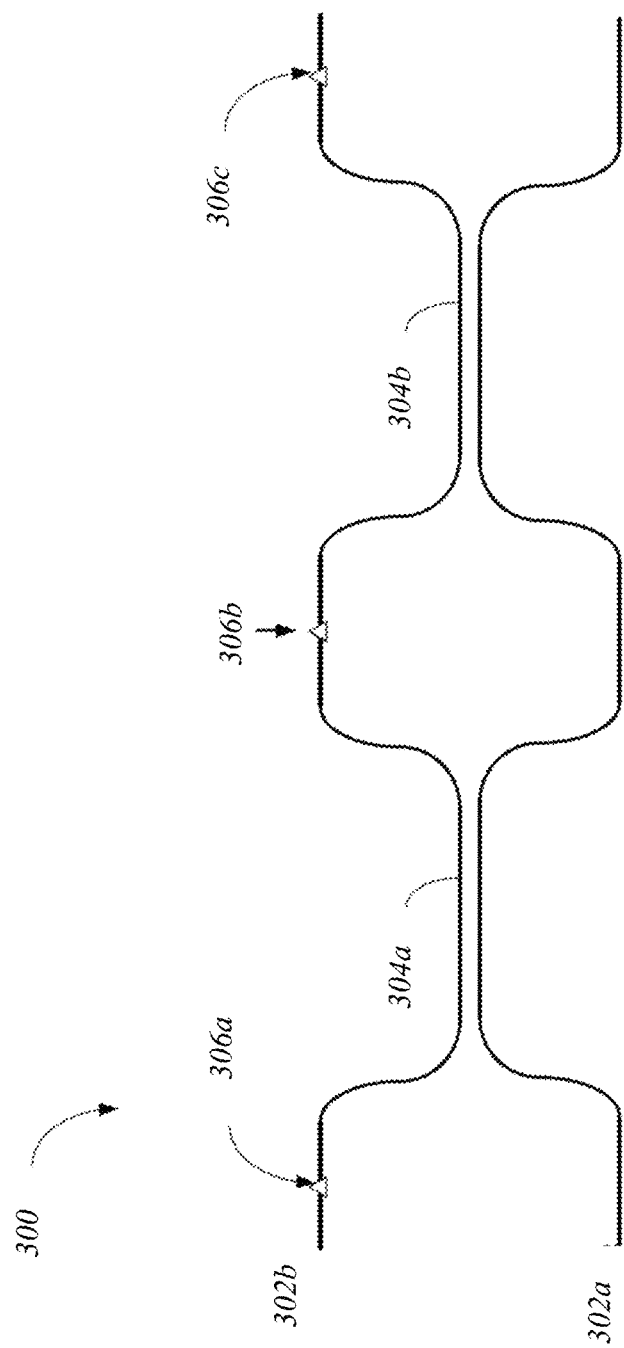
FIGS. 3A and 3B show, in schematic form, examples of physical implementations of a Mach-Zehnder Interferometer (MZI) configuration that can be used in some embodiments.
Figure 3B:
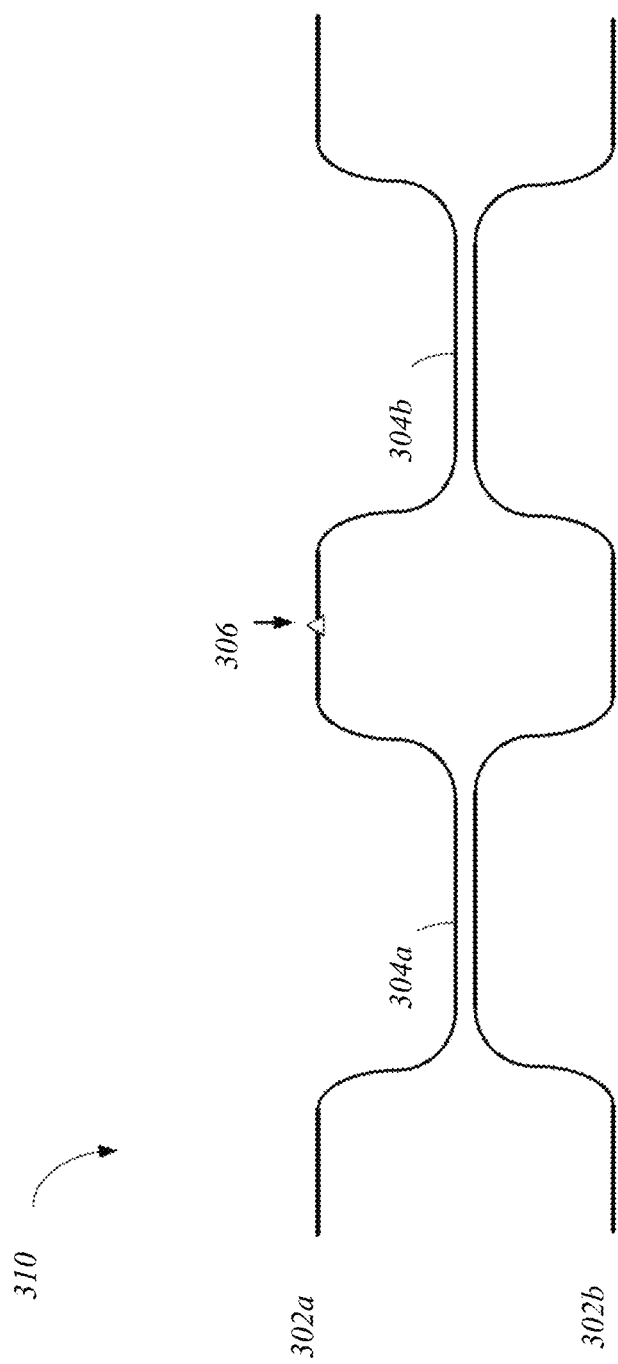

Beam-splitters with variable transmissivity and arbitrary phase relationships between output modes can also be achieved by combining directional couplers and variable phase-shifters in a Mach-Zehnder Interferometer (MZI) configuration 300, e.g., as shown in FIG. 3A. Complete control over the relative phase and amplitude of the two modes 302a, 302b in dual rail encoding can be achieved by varying the phases imparted by phase shifters 306a, 306b, and 306c and the length and proximity of coupling regions 304a and 304b. FIG. 3B shows a slightly simpler example of a MZI 310 that allows for a variable transmissivity between modes 302a, 302b by varying the phase imparted by the phase shifter 306. FIGS. 3A and 3B are examples of how one could implement a mode coupler in a physical device, but any type of mode coupler/beam splitter can be used without departing from the scope of the present disclosure.

Figure 4A:
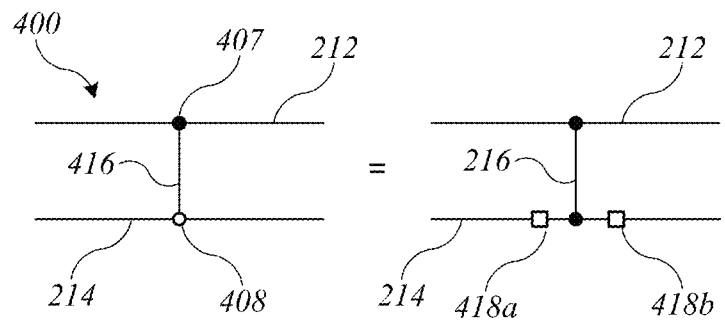
FIG. 4A shows another schematic diagram for coupling of two modes.

In some embodiments, beam splitters and phase shifters can be employed in combination to implement a variety of transfer matrices. For example, FIG. 4A shows, in a schematic form similar to that of FIG. 2A, a mode coupler 400 implementing the following transfer matrix:

$$T_r = \frac{1}{\sqrt{2}}\begin{pmatrix} 1 & 1 \\ 1 & -1 \end{pmatrix}. \quad (15)$$

Thus, mode coupler 400 applies the following mappings:

$$|10\rangle \mapsto \frac{|10\rangle - |01\rangle}{\sqrt{2}} \quad (16)$$

$$|01\rangle \mapsto \frac{|10\rangle + |01\rangle}{\sqrt{2}}$$

$$|11\rangle \mapsto \frac{1}{2}(|20\rangle + |02\rangle).$$

Figure 4B:
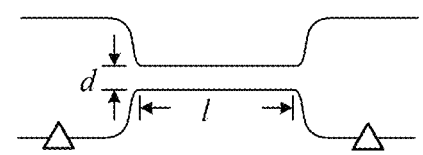
FIG. 4B shows, in schematic form, a physical implementation of the mode coupling of FIG. 4A in a photonic system that can be used in some embodiments.

The transfer matrix $T_r$ of Eq. (15) is related to the transfer matrix T of Eq. (9) by a phase shift on the second mode. This is schematically illustrated in FIG. 4A by the closed node 407 where mode coupler 416 couples to the first mode (line 212) and open node 408 where mode coupler 416 couples to the second mode (line 214). More specifically, $T_r$=sTs, and, as shown at the right-hand side of FIG. 4A, mode coupler 416 can be implemented using mode coupler 216 (as described above), with a preceding and following phase shift (denoted by open squares 418a, 418b). Thus, the transfer matrix $T_r$ can be implemented by the physical beam splitter shown in FIG. 4B, where the open triangles represent +i phase shifters.

Figure 5:
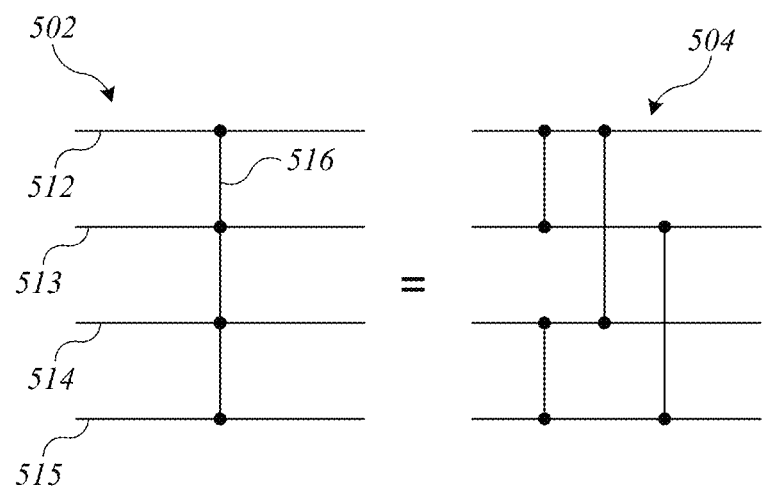
FIG. 5 shows a four-mode coupling scheme that implements a "spreader," or "mode-information erasure," transformation on four modes in accordance with some embodiments.

Similarly, networks of mode couplers and phase shifters can be used to implement couplings among more than two modes. For example, FIG. 5 shows a four-mode coupling scheme that implements a "spreader," or "mode-information erasure," transformation on four modes, i.e., it takes a photon in any one of the input modes and delocalizes the photon amongst each of the four output modes such that the photon has equal probability of being detected in any one of the four output modes. (The well-known Hadamard transformation is one example of a spreader transformation.) As in FIG. 2A, the horizontal lines 512-515 correspond to modes, and the mode coupling is indicated by a vertical line 516 with nodes (dots) to identify the modes being coupled. In this case, four modes are coupled. Circuit notation 502 is an equivalent representation to circuit diagram 504, which is a network of first-order mode couplings. More generally, where a higher-order mode coupling can be implemented as a network of first-order mode couplings, a circuit notation similar to notation 502 (with an appropriate number of modes) may be used.

Figure 6:
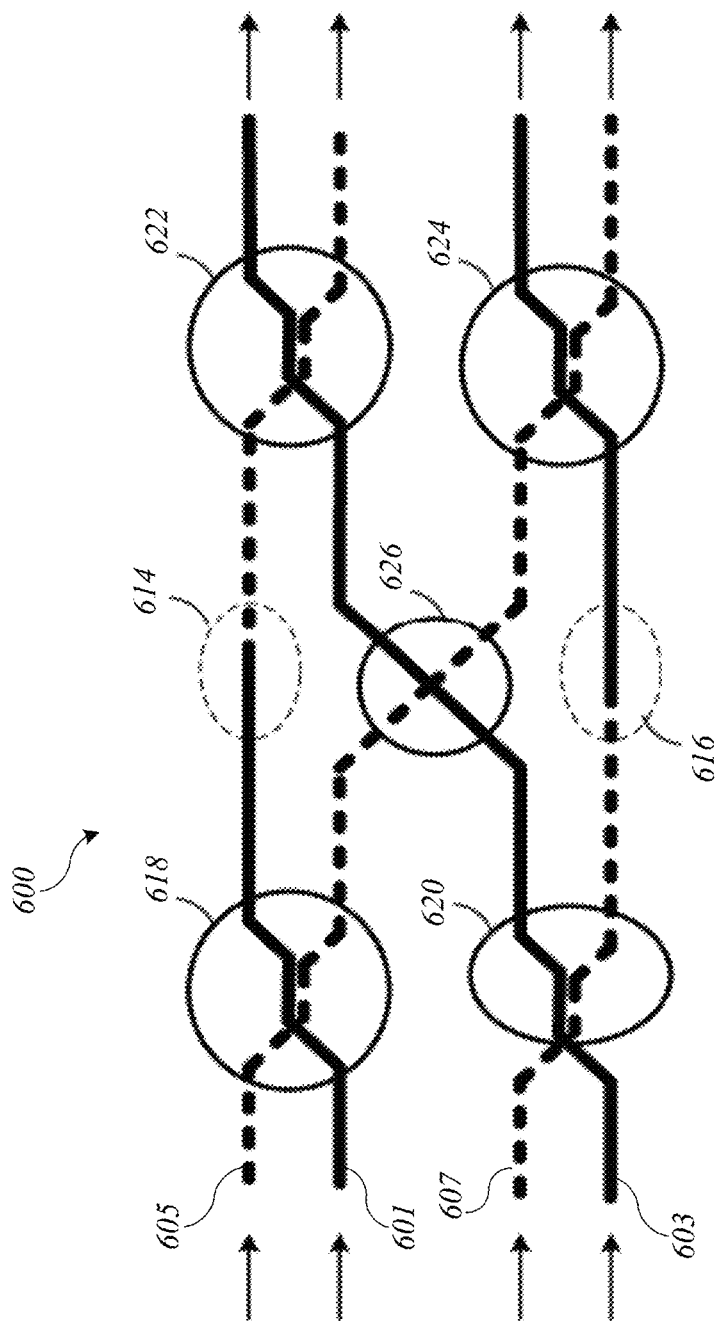
FIG. 6 illustrates an example optical device that can implement the four-mode mode-spreading transform shown schematically in FIG. 5 in accordance with some embodiments.

FIG. 6 illustrates an example optical device 600 that can implement the four-mode mode-spreading transform shown schematically in FIG. 5 in accordance with some embodiments. Optical device 600 includes a first set of optical waveguides 601, 603 formed in a first layer of material (represented by solid lines in FIG. 6) and a second set of optical waveguides 605, 607 formed in a second layer of material that is distinct and separate from the first layer of material (represented by dashed lines in FIG. 6). The second layer of material and the first layer of material are located at different heights on a substrate. One of ordinary skill will appreciate that an interferometer such as that shown in FIG. 6 could be implemented in a single layer if appropriate low loss waveguide crossing were employed.

At least one optical waveguide 601, 603 of the first set of optical waveguides is coupled with an optical waveguide 605, 607 of the second set of optical waveguides with any type of suitable optical coupler, e.g., the directional couplers described herein (e.g., the optical couplers shown in FIGS. 2B, 3A, 3B). For example, the optical device shown in FIG. 6 includes four optical couplers 618, 620, 622, and 624. Each optical coupler can have a coupling region in which two waveguides propagate in parallel. Although the two waveguides are illustrated in FIG. 6 as being offset from each other in the coupling region, the two waveguides may be positioned directly above and below each other in the coupling region without offset. In some embodiments, one or more of the optical couplers 618, 620, 622, and 624 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 6 can include two inter-layer optical couplers 614 and 616. Optical coupler 614 allows transfer of light propagating in a waveguide on the first layer of material to a waveguide on the second layer of material, and optical coupler 616 allows transfer of light propagating in a waveguide on the second layer of material to a waveguide on the first layer of material. The optical couplers 614 and 616 allow optical waveguides located in at least two different layers to be used in a multi-channel optical coupler, which, in turn, enables a compact multi-channel optical coupler.

Furthermore, the optical device shown in FIG. 6 includes a non-coupling waveguide crossing region 626. In some implementations, the two waveguides (603 and 605 in this example) cross each other without having a parallel coupling region present at the crossing in the non-coupling waveguide crossing region 626 (e.g., the waveguides can be two straight waveguides that cross each other at a nearly 90-degree angle).

Those skilled in the art will understand that the foregoing examples are illustrative and that photonic circuits using beam splitters and/or phase shifters can be used to implement many different transfer matrices, including transfer matrices for real and imaginary Hadamard transforms of any order, discrete Fourier transforms, and the like. One class of photonic circuits, referred to herein as "spreader" or "mode-information erasure (MIE)" circuits, has the property that if the input is a single photon localized in one input mode, the circuit delocalizes the photon amongst each of a number of output modes such that the photon has equal probability of being detected in any one of the output modes. Examples of spreader or MIE circuits include circuits implementing Hadamard transfer matrices. (It is to be understood that spreader or MIE circuits may receive an input that is not a single photon localized in one input mode, and the behavior of the circuit in such cases depends on the particular transfer matrix implemented.) In other instances, photonic circuits can implement other transfer matrices, including transfer matrices that, for a single photon in one input mode, provide unequal probability of detecting the photon in different output modes.

Figure 7:
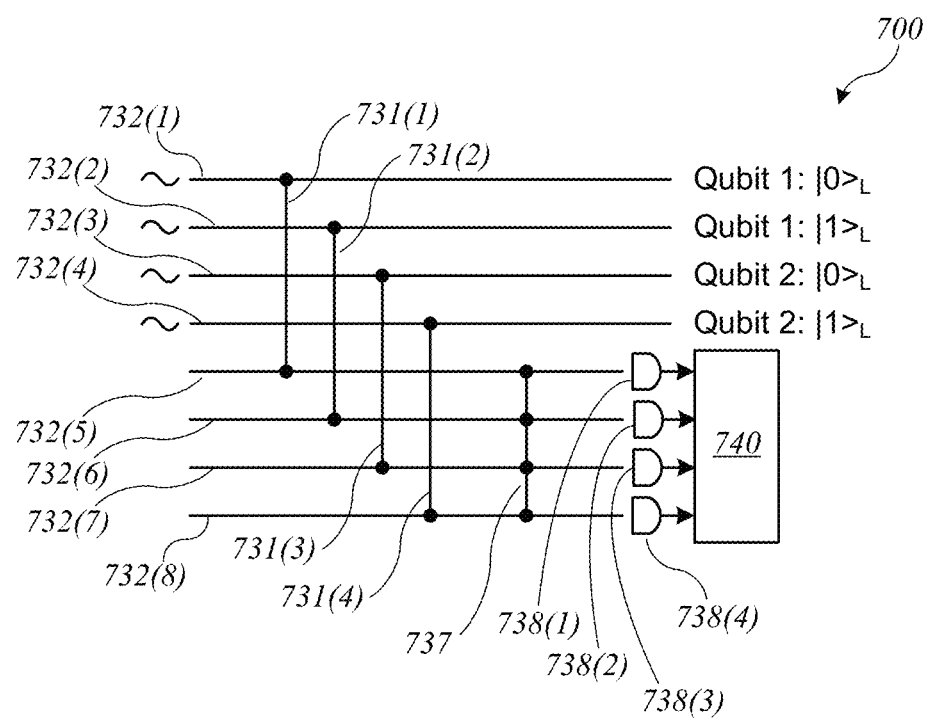
FIG. 7 shows a circuit diagram for a dual-rail-encoded Bell state generator that can be used in some embodiments.

In some embodiments, entangled states of multiple photonic qubits can be created by coupling modes of two (or more) qubits and performing measurements on other modes. By way of example, FIG. 7 shows a circuit diagram for a Bell state generator 700 that can be used in some dual-rail-encoded photonic embodiments. In this example, modes 732(1)-732(4) are initially each occupied by a photon (indicated by a wavy line); modes 732(5)-732(8) are initially vacuum modes. (Those skilled in the art will appreciate that other combinations of occupied and unoccupied modes can be used.)

A first-order mode coupling (e.g., implementing transfer matrix T of Eq. (9)) is performed on pairs of occupied and unoccupied modes as shown by mode couplers 731(1)-731(4). Thereafter, a mode-information erasure coupling (e.g., implementing a four-mode mode spreading transform as shown in FIG. 5) is performed on four of the modes (modes 732(5)-732(8)), as shown by mode coupler 737. Modes 732(5)-732(8) act as "heralding" modes that are measured and used to determine whether a Bell state was successfully generated on the other four modes 732(1)-732(4). For instance, detectors 738(1)-738(4) can be coupled to the modes 732(5)-732(8) after second-order mode coupler 737. Each detector 738(1)-738(4) can output a classical data signal (e.g., a voltage level on a conductor) indicating whether it detected a photon (or the number of photons detected). These outputs can be coupled to classical decision logic circuit 740 (also referred to as a "classical control logic circuit"), which determines whether a Bell state is present on the other four modes 732(1)-732(4). For example, decision logic circuit 740 can be configured such that a Bell state is confirmed (also referred to as "success" of the Bell state generator) if and only if a single photon was detected by each of exactly two of detectors 738(1)-738(4). Modes 732(1)-732(4) can be mapped to the logical states of two qubits (Qubit 1 and Qubit 2), as indicated in FIG. 7. Specifically, in this example, the logical state of Qubit 1 is based on occupancy of modes 732(1) and 732(2), and the logical state of Qubit 2 is based on occupancy of modes 732(3) and 732(4). It should be noted that the operation of Bell state generator 700 can be non-deterministic; that is, inputting four photons as shown does not guarantee that a Bell state will be created on modes 732(1)-732(4). In one implementation, the probability of success is 4/32.

In some embodiments, it is desirable to form cluster states of multiple entangled qubits (typically 3 or more qubits, although the Bell state can be understood as a cluster state of two qubits). One technique for forming larger entangled systems is through the use of an entangling measurement, which is a projective measurement that can be employed to create entanglement between systems of qubits. As used herein, "fusion" (or "a fusion operation" or "fusing") refers to a two-qubit entangling measurement. A "fusion gate" is a structure that receives two input qubits, each of which is typically part of an entangled system. The fusion gate performs a projective measurement operation on the input qubits that produces either one ("type I fusion") or zero ("type II fusion") output qubits in a manner such that the initial two entangled systems are fused into a single entangled system. Fusion gates are specific examples of a general class of two-qubit entangling measurements and are particularly suited for photonic architectures. Examples of type I and type II fusion gates will now be described.

Figure 8A:
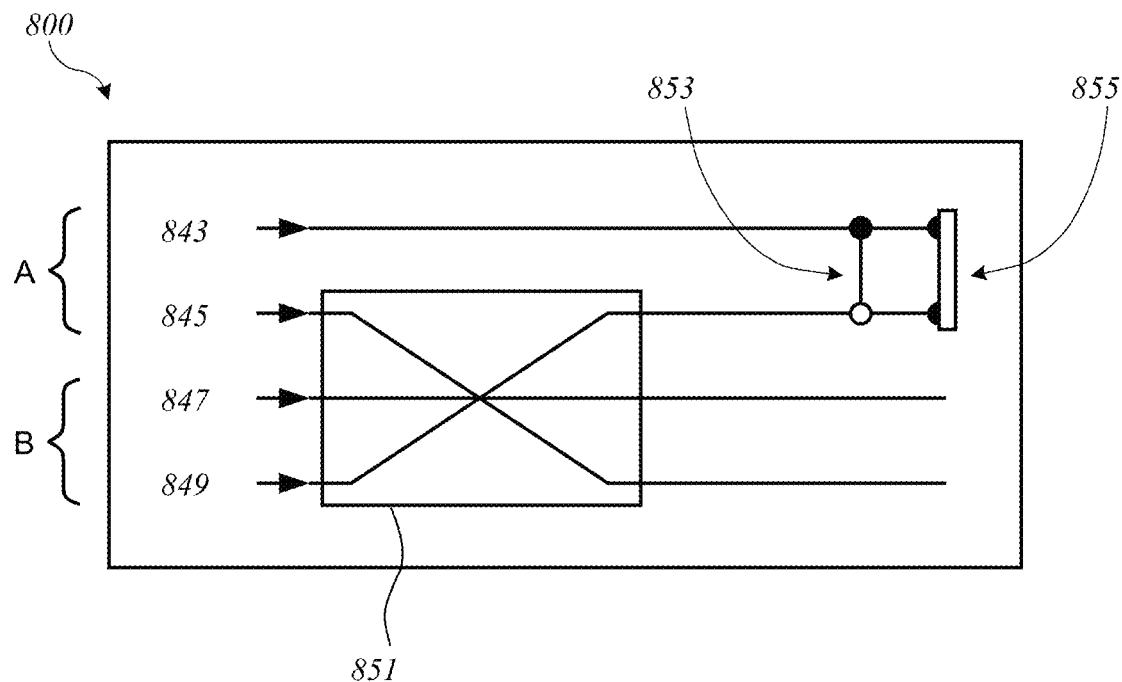
FIG. 8A shows a circuit diagram for a dual-rail-encoded type I fusion gate that can be used in some embodiments.

FIG. 8A shows a circuit diagram illustrating a type I fusion gate 800 in accordance with some embodiments. The diagram shown in FIG. 8A is schematic with each horizontal line representing a mode of a quantum system, e.g., a photon. In a dual-rail encoding, each pair of modes represents a qubit. In a photonic implementation of the gate the modes in diagrams such as that shown in FIG. 8A can be physically realized using single photons in photonic waveguides. Most generally, a type I fusion gate like that shown in FIG. 8A takes qubit A (physically realized, e.g., by photon modes 843 and 845) and qubit B (physically realized, e.g., by photon modes 847 and 849) as input and outputs a single "fused" qubit that inherits the entanglement with other qubits that were previously entangled with either (or both) of input qubit A or input qubit B.

Figure 8B:
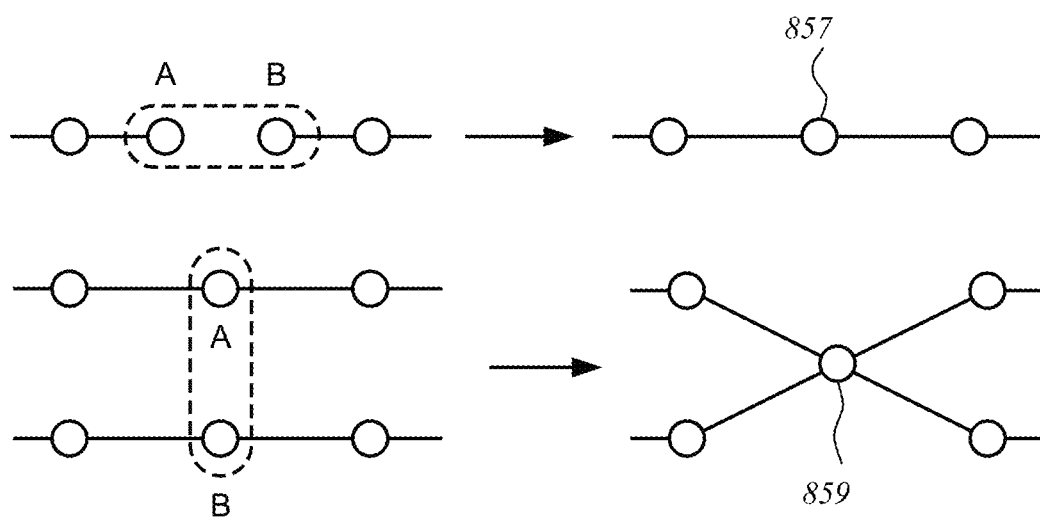
FIG. 8B shows example results of type I fusion operations using the gate of FIG. 8A.

For example, FIG. 8B shows the result of type-I fusing of two qubits A and B that are each, respectively, a qubit located at the end (i.e., a leaf) of some longer entangled cluster state (only a portion of which is shown). The qubit 857 that remains after the fusion operation inherits the entangling bonds from the original qubits A and B thereby creating a larger linear cluster state. FIG. 8B also shows the result of type-I fusing of two qubits A and B that are each, respectively, an internal qubit that belongs to some longer entangled cluster of qubits (only a portion of which is shown). As before, the qubit 859 that remains after fusion inherits the entangling bonds from the original qubits A and B thereby creating a fused cluster state. In this case, the qubit that remains after the fusion operation is entangled with the larger cluster by way of four other nearest neighbor qubits as shown.

Returning to the schematic illustration of type I fusion gate 800 shown in FIG. 8A, qubit A is dual-rail encoded by modes 843 and 845, and qubit B is dual-rail encoded by modes 847 and 849. For example, in the case of path-encoded photonic qubits, the logical zero state of qubit A (denoted $|0\rangle_A$) occurs when mode 843 is a photonic waveguide that includes a single photon and mode 845 is a photonic waveguide that includes zero photons (and likewise for qubit B). Thus, type I fusion gate 800 can take as input two dual-rail-encoded photon qubits thereby resulting in a total of four input modes (e.g., modes 843, 845, 847, and 849). To accomplish the fusion operation, a mode coupler (e.g., 50/50 beam splitter) 853 is applied between a mode of each of the input qubits, e.g., between mode 843 and mode 849 before performing a detection operation on both modes using photon detectors 855 (which includes two distinct photon detectors coupled to modes 843 and 849 respectively). In addition, to ensure that the output modes are adjacently positioned, a mode swap operation 851 can be applied that swaps the position of the second mode of qubit A (mode 845) with the position the second mode of qubit B (mode 849). In some embodiments, mode swapping can be accomplished through a physical waveguide crossing as described above or by one or more photonic switches or by any other type of physical mode swap.

FIG. 8A shows only an example arrangement for a type I fusion gate and one of ordinary skill will appreciate that the position of the mode coupler and the presence of the mode swap region 851 can be altered without departing from the scope of the present disclosure. For example, beam splitter 853 can be applied between modes 845 and 847. Mode swaps are optional and are not necessary if qubits having non-adjacent modes can be dealt with, e.g., by tracking which modes belong to which qubits by storing this information in a classical memory.

Type I fusion gate 800 is a nondeterministic gate, i.e., the fusion operation succeeds with a certain probability less than 1, and in other cases the quantum state that results is not a larger cluster state that comprises the original cluster states fused together to a larger cluster state. More specifically, gate 800 "succeeds," with probability 50%, when only one photon is detected by detectors 855, and "fails" if zero or two photons are detected by detectors 855. When the gate succeeds, the two cluster states that qubits A and B were a part of become fused into a single larger cluster state with a fused qubit remaining as the qubit that links the two previously unlinked cluster states (see, e.g., FIG. 8B). However, when the fusion gate fails, it has the effect of removing both qubits from the original cluster resource states without generating a larger fused state.

Figure 9A:
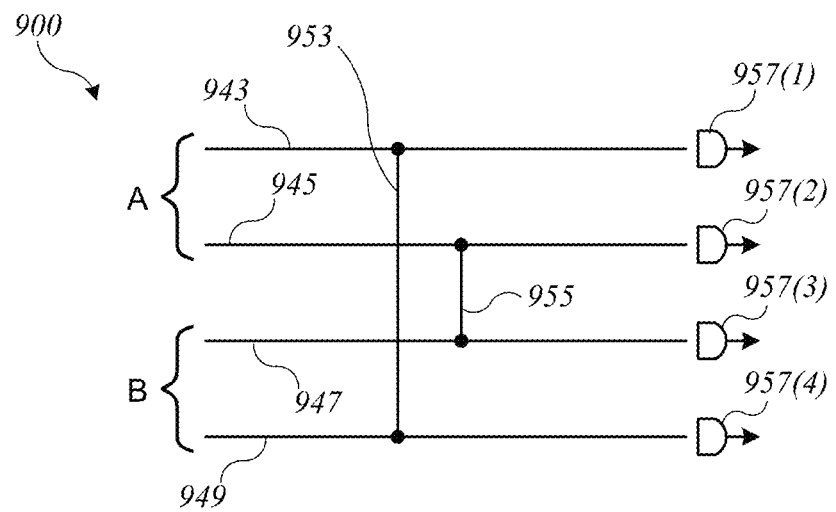
FIG. 9A shows a circuit diagram for a dual-rail-encoded type II fusion gate that can be used in some embodiments.

FIG. 9A shows a circuit diagram illustrating a type II fusion gate 900 in accordance with some embodiments. Like other diagrams herein, the diagram shown in FIG. 9A is schematic with each horizontal line representing a mode of a quantum system, e.g., a photon. In a dual-rail encoding, each pair of modes represents a qubit. In a photonic implementation of the gate the modes in diagrams such as that shown in FIG. 9A can be physically realized using single photons in photonic waveguides. Most generally, a type II fusion gate such as gate 900 takes qubit A (physically realized, e.g., by photon modes 943 and 945) and qubit B (physically realized, e.g., by photon modes 947 and 949) as input and outputs a quantum state that inherits the entanglement with other qubits that were previously entangled with either (or both) of input qubit A or input qubit B. (For type II fusion, if the input quantum state had N qubits, the output quantum state has N−2 qubits. This is different from type I fusion where an input quantum state of N qubits leads to an output quantum state having N−1 qubits.)

Figure 9B:
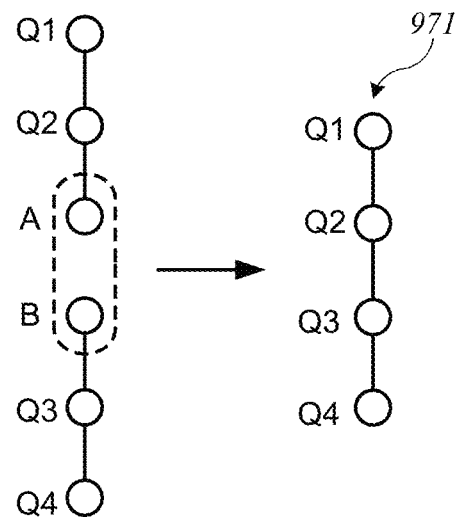
FIG. 9B shows an example result of a type II fusion operation using the gate of FIG. 9A.

For example, FIG. 9B shows the result of type-II fusing of two qubits A and B that are each, respectively, a qubit located at the end (i.e., a leaf) of some longer entangled cluster state (only a portion of which is shown). The resulting qubit system 971 inherits the entangling bonds from qubits A and B thereby creating a larger linear cluster state.

Returning to the schematic illustration of type II fusion gate 900 shown in FIG. 9A, qubit A is dual-rail encoded by modes 943 and 945, and qubit B is dual-rail encoded by modes 947 and 949. For example, in the case of path encoded photonic qubits, the logical zero state of qubit A (denoted $|0\rangle_A$) occurs when mode 943 is a photonic waveguide that includes a single photon and mode 945 is a photonic waveguide that includes zero photons (and likewise for qubit B). Thus, type II fusion gate 900 takes as input two dual-rail-encoded photon qubits thereby resulting in a total of four input modes (e.g., modes 943, 945, 947, and 949). To accomplish the fusion operation, a first mode coupler (e.g., 50/50 beam splitter) 953 is applied between a mode of each of the input qubits, e.g., between mode 943 and mode 949, and a second mode coupler (e.g., 50/50 beam splitter) 955 is applied between the other modes of each of the input qubits, e.g., between modes 945 and 947. A detection operation is performed on all four modes using photon detectors 957(1)-957(4). In some embodiments, mode swap operations (not shown in FIG. 9A) can be performed to place modes in adjacent positions prior to mode coupling. In some embodiments, mode swapping can be accomplished through a physical waveguide crossing as described above or by one or more photonic switches or by any other type of physical mode swap. Mode swaps are optional and are not necessary if qubits having non-adjacent modes can be dealt with, e.g., by tracking which modes belong to which qubits by storing this information in a classical memory.

FIG. 9A shows only an example arrangement for the type II fusion gate and one of ordinary skill will appreciate that the positions of the mode couplers and the presence or absence of mode swap regions can be altered without departing from the scope of the present disclosure.

The type II fusion gate shown in FIG. 9A is a nondeterministic gate, i.e., the fusion operation succeeds with a certain probability less than 1, and in other cases the quantum state that results is not a larger cluster state that comprises the original cluster states fused together to a larger cluster state. More specifically, the gate "succeeds" in the case where one photon is detected by one of detectors 957(1) and 957(4) and one photon is detected by one of detectors 957(2) and 957(3); in all other cases, the gate "fails." When the gate succeeds, the two cluster states that qubits A and B were a part of become fused into a single larger cluster state; unlike type-I fusion, no fused qubit remains (compare FIG. 8B and FIG. 9B). When the fusion gate fails, it has the effect of removing both qubits from the original cluster resource states without generating a larger fused state.

Figure 10:
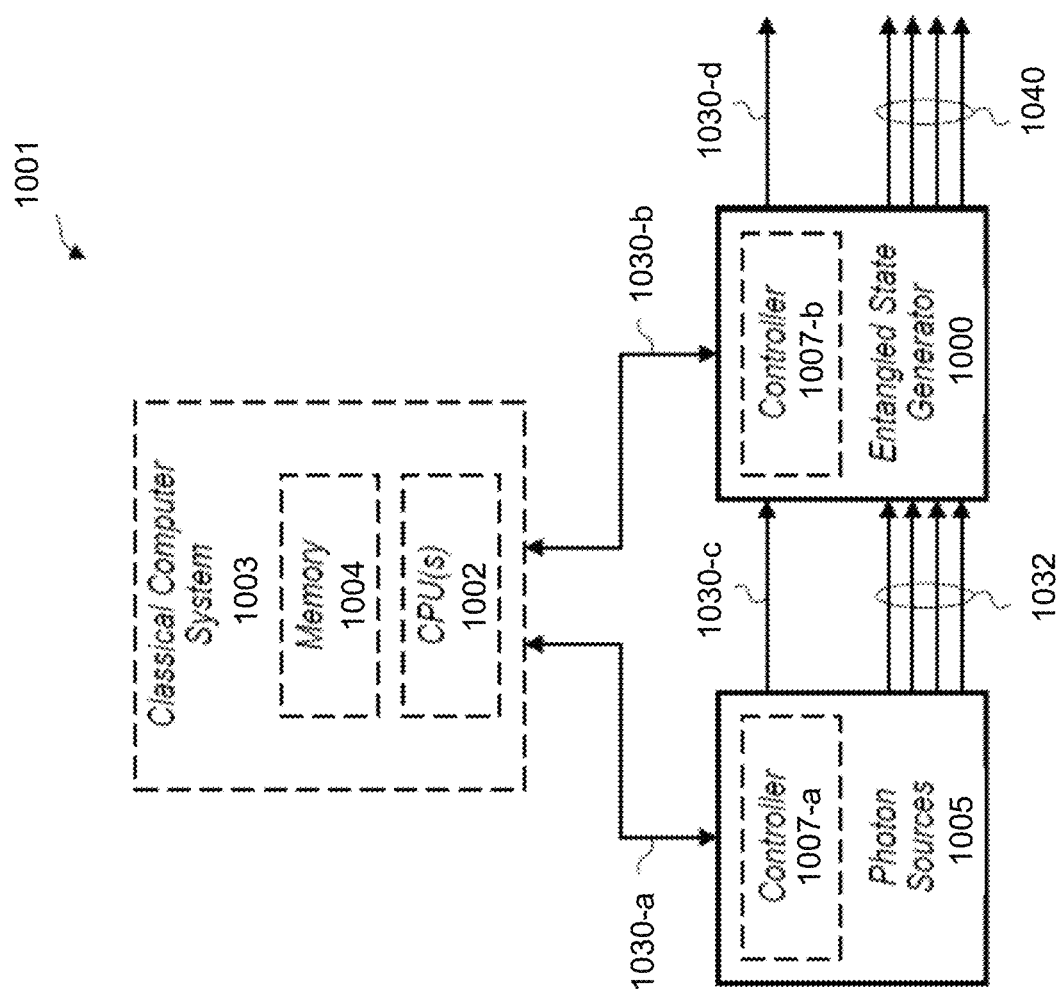
FIG. 10 illustrates an example of a qubit entangling system 1001 in accordance with some embodiments.

FIG. 10 illustrates an example of a qubit entangling system 1001 in accordance with some embodiments. Such a system can be used to generate qubits (e.g., photons) in an entangled state (e.g., a GHZ state, Bell pair, and the like), in accordance with some embodiments.

In an illustrative photonic architecture, qubit entangling system 1001 can include a photon source module 1005 that is optically connected to entangled state generator 1000. Both the photon source module 1005 and the entangled state generator 1000 may be coupled to a classical processing system 1003 such that the classical processing system 1003 can communicate and/or control (e.g., via the classical information channels 1030a-b) the photon source module 1005 and/or the entangled state generator 1000. Photon source module 1005 may include a collection of single-photon sources that can provide output photons to entangled state generator 1000 by way of interconnecting waveguides 1032. Entangled state generator 1000 may receive the output photons and convert them to one or more entangled photonic states and then output these entangled photonic states into output waveguides 1040. In some embodiments, output waveguide 1040 can be coupled to some downstream circuit that may use the entangled states for performing a quantum computation. For example, the entangled states generated by the entangled state generator 1000 may be used as resources for a downstream quantum optical circuit (not shown).

In some embodiments, system 1001 may include classical channels 1030 (e.g., classical channels 1030-*a* through 1030-*d*) for interconnecting and providing classical information between components. It should be noted that classical channels 1030-*a* through 1030-*d* need not all be the same. For example, classical channel 1030-*a* through 1030-*c* may comprise a bi-directional communication bus carrying one or more reference signals, e.g., one or more clock signals, one or more control signals, or any other signal that carries classical information, e.g., heralding signals, photon detector readout signals, and the like.

In some embodiments, qubit entangling system 1001 includes the classical computer system 1003 that communicates with and/or controls the photon source module 1005 and/or the entangled state generator 1000. For example, in some embodiments, classical computer system 1003 can be used to configure one or more circuits, e.g., using system clock that may be provided to photon sources 1005 and entangled state generator 1000 as well as any downstream quantum photonic circuits used for performing quantum computation. In some embodiments, the quantum photonic circuits can include optical circuits, electrical circuits, or any other types of circuits. In some embodiments, classical computer system 1003 includes memory 1004, one or more processor(s) 1002, a power supply, an input/output (I/O) subsystem, and a communication bus or interconnecting these components. The processor(s) 1002 may execute modules, programs, and/or instructions stored in memory 1004 and thereby perform processing operations.

In some embodiments, memory 1004 stores one or more programs (e.g., sets of instructions) and/or data structures. For example, in some embodiments, entangled state generator 1000 can attempt to produce an entangled state over successive stages, any one of which may be successful in producing an entangled state. In some embodiments, memory 1004 stores one or more programs for determining whether a respective stage was successful and configuring the entangled state generator 1000 accordingly (e.g., by configuring entangled state generator 1000 to switch the photons to an output if the stage was successful, or pass the photons to the next stage of the entangled state generator 1000 if the stage was not yet successful). To that end, in some embodiments, memory 1004 stores detection patterns (described below) from which the classical computing system 1003 may determine whether a stage was successful. In addition, memory 1004 can store settings that are provided to the various configurable components (e.g., switches) described herein that are configured by, e.g., setting one or more phase shifts for the component.

In some embodiments, some or all of the above-described functions may be implemented with hardware circuits on photon source module 1005 and/or entangled state generator 1000. For example, in some embodiments, photon source module 1005 includes one or more controllers 1007-*a* (e.g., logic controllers) (e.g., which may comprise field programmable gate arrays (FPGAs), application specific integrated circuits (ASICS), a "system on a chip" that includes classical processors and memory, or the like). In some embodiments, controller 1007-*a* determines whether photon source module 1005 was successful (e.g., for a given attempt on a given clock cycle, described below) and outputs a reference signal indicating whether photon source module 1005 was successful. For example, in some embodiments, controller 1007-*a* outputs a logical high value to classical channel 1030-*a* and/or classical channel 1030-*c* when photon source module 1005 is successful and outputs a logical low value to classical channel 1030-*a* and/or classical channel 1030-*c* when photon source module 1005 is not successful. In some embodiments, the output of control 1007-*a* may be used to configure hardware in controller 1007-*b*.

Similarly, in some embodiments, entangled state generator 1000 includes one or more controllers 1007-*b* (e.g., logical controllers) (e.g., which may comprise field programmable gate arrays (FPGAs), application specific integrated circuits (ASICS), or the like) that determine whether a respective stage of entangled state generator 1000 has succeeded, perform the switching logic described above, and output a reference signal to classical channels 1030-*b* and/or 1030-*d* to inform other components as to whether the entangled state generator 400 has succeeded.

In some embodiments, a system clock signal can be provided to photon source module 1005 and entangled state generator 1000 via an external source (not shown) or by classical computing system 1003 generates via classical channels 1030-*a* and/or 1030-*b*. In some embodiments, the system clock signal provided to photon source module 1005 triggers photon source module 1005 to attempt to output one photon per waveguide. In some embodiments, the system clock signal provided to entangled state generator 1000 triggers, or gates, sets of detectors in entangled state generator 1000 to attempt to detect photons. For example, in some embodiments, triggering a set of detectors in entangled state generator 1000 to attempt to detect photons includes gating the set of detectors.

It should be noted that, in some embodiments, photon source module 1005 and entangled state generator 1000 may have internal clocks. For example, photon source module 1005 may have an internal clock generated and/or used by controller 1007-*a* and entangled state generator 1000 has an internal clock generated and/or used by controller 1007-*b*. In some embodiments, the internal clock of photon source module 1005 and/or entangled state generator 1000 is synchronized to an external clock (e.g., the system clock provided by classical computer system 1003) (e.g., through a phase-locked loop). In some embodiments, any of the internal clocks may themselves be used as the system clock, e.g., an internal clock of the photon source may be distributed to other components in the system and used as the master/system clock.

In some embodiments, photon source module 1005 includes a plurality of probabilistic photon sources that may be spatially and/or temporally multiplexed, i.e., a so-called multiplexed single photon source. In one example of such a source, the source is driven by a pump, e.g., a light pulse, that is coupled into an optical resonator that, through some nonlinear process (e.g., spontaneous four wave mixing, second harmonic generation, and the like) may generate zero, one, or more photons. As used herein, the term "attempt" is used to refer to the act of driving a photon source with some sort of driving signal, e.g., a pump pulse, that may produce output photons non-deterministically (i.e., in response to the driving signal, the probability that the photon source will generate one or more photons may be less than 1). In some embodiments, a respective photon source may be most likely to, on a respective attempt, produce zero photons (e.g., there may be a 90% probability of producing zero photons per attempt to produce a single-photon). The second most likely result for an attempt may be production of a single-photon (e.g., there may be a 9% probability of producing a single-photon per attempt to produce a single-photon). The third most likely result for an attempt may be production of two photons (e.g., there may be an approximately 1% probability of producing two photons per attempt to produce a single photon). In some circumstances, there may be less than a 1% probability of producing more than two photons.

In some embodiments, the apparent efficiency of the photon sources may be increased by using a plurality of single-photon sources and multiplexing the outputs of the plurality of photon sources.

The precise type of photon source used is not critical and any type of source can be used, employing any photon generating process, such as spontaneous four wave mixing (SPFW), spontaneous parametric down-conversion (SPDC), or any other process. Other classes of sources that do not necessarily require a nonlinear material can also be employed, such as those that employ atomic and/or artificial atomic systems, e.g., quantum dot sources, color centers in crystals, and the like. In some cases, sources may or may not be coupled to photonic cavities, e.g., as can be the case for artificial atomic systems such as quantum dots coupled to cavities. Other types of photon sources also exist for SPWM and SPDC, such as optomechanical systems and the like. In some examples the photon sources can emit multiple photons already in an entangled state in which case the entangled state generator 400 may not be necessary, or alternatively may take the entangled states as input and generate even larger entangled states.

For the sake of illustration, an example which employs spatial multiplexing of several non-deterministic is described as an example of a MUX photon source. However, many different spatial MUX architectures are possible without departing from the scope of the present disclosure. Temporal MUXing can also be implemented instead of or in combination with spatial multiplexing. MUX schemes that employ log-tree, generalized Mach-Zehnder interferometers, multimode interferometers, chained sources, chained sources with dump-the-pump schemes, asymmetric multi-crystal single photon sources, or any other type of MUX architecture can be used. In some embodiments, the photon source can employ a MUX scheme with quantum feedback control and the like.

The foregoing description provides an example of how photonic circuits can be used to implement physical qubits and operations on physical qubits using mode coupling between waveguides. In these examples, a pair of modes can be used to represent each physical qubit. Examples described below can be implemented using similar photonic circuit elements.

2. Qudit Pair Generator

As noted above, for an integer d, a qudit can be any quantum system having a quantum state space that can be modeled as a (complex) d-dimensional vector space, which can be used to encode one or more bits of information. For example, a qudit can be encoded using a single photon and a set of d waveguides. More generally, a qudit can be encoded using any set of d modes. Like a qubit, a qudit can exist in a superposition of states, and multiple qudits can be entangled with each other.

It can be useful for various applications to create qudit pairs in a maximally entangled state. For example, an entangled state of two photons in n modes can be expressed as:

$$|\phi_n\rangle = \frac{1}{\sqrt{2n}} \sum_{i=1}^{n} (\hat{a}_i^\dagger)^2 |vac\rangle. \qquad (17)$$

In the Fock notation defined above, Eq. (17) can be expressed as:

$$|\phi_n\rangle = \frac{1}{\sqrt{n}}(|20\ldots 0\rangle + |02\ldots 0\rangle + \ldots + |00\ldots 2\rangle), \qquad (18)$$

where each ket includes n modes. If n=2d, the state $|\phi_n\rangle$ can, loosely speaking, be understood as a maximally entangled state $|I_d\rangle$ of two qudits in a state space of dimension d, analogous to the Bell states of Eqs. (3)-(6). That is:

$$|I_d\rangle = \frac{1}{\sqrt{d}} \sum_{i=1}^{d} \hat{a}_i^\dagger \hat{a}_{i+d}^\dagger |vac\rangle. \qquad (19)$$

In the Fock notation defined above, Eq. (19) can be expressed as:

$$|I_d\rangle = \frac{1}{\sqrt{d}}(|10\ldots 0\rangle|10\ldots 0\rangle + |01\ldots 0\rangle|01\ldots 0\rangle + \qquad (20a)$$
$$\ldots + |00\ldots 1\rangle|00\ldots 1\rangle)$$
$$= \frac{1}{\sqrt{d}}(|00\rangle_L + |11\rangle_L + \ldots + |(d-1)(d-1)\rangle_L), \qquad (20b)$$

where each ket in Eq. (20a) includes d modes and kets in Eq. (20b) represent logical states of a pair of qudits. For the case where d=2 (n=4), the state $|I_2\rangle$ corresponds to the Bell state $|\Phi^+\rangle$ of Eq. (3) above.

Figure 11:
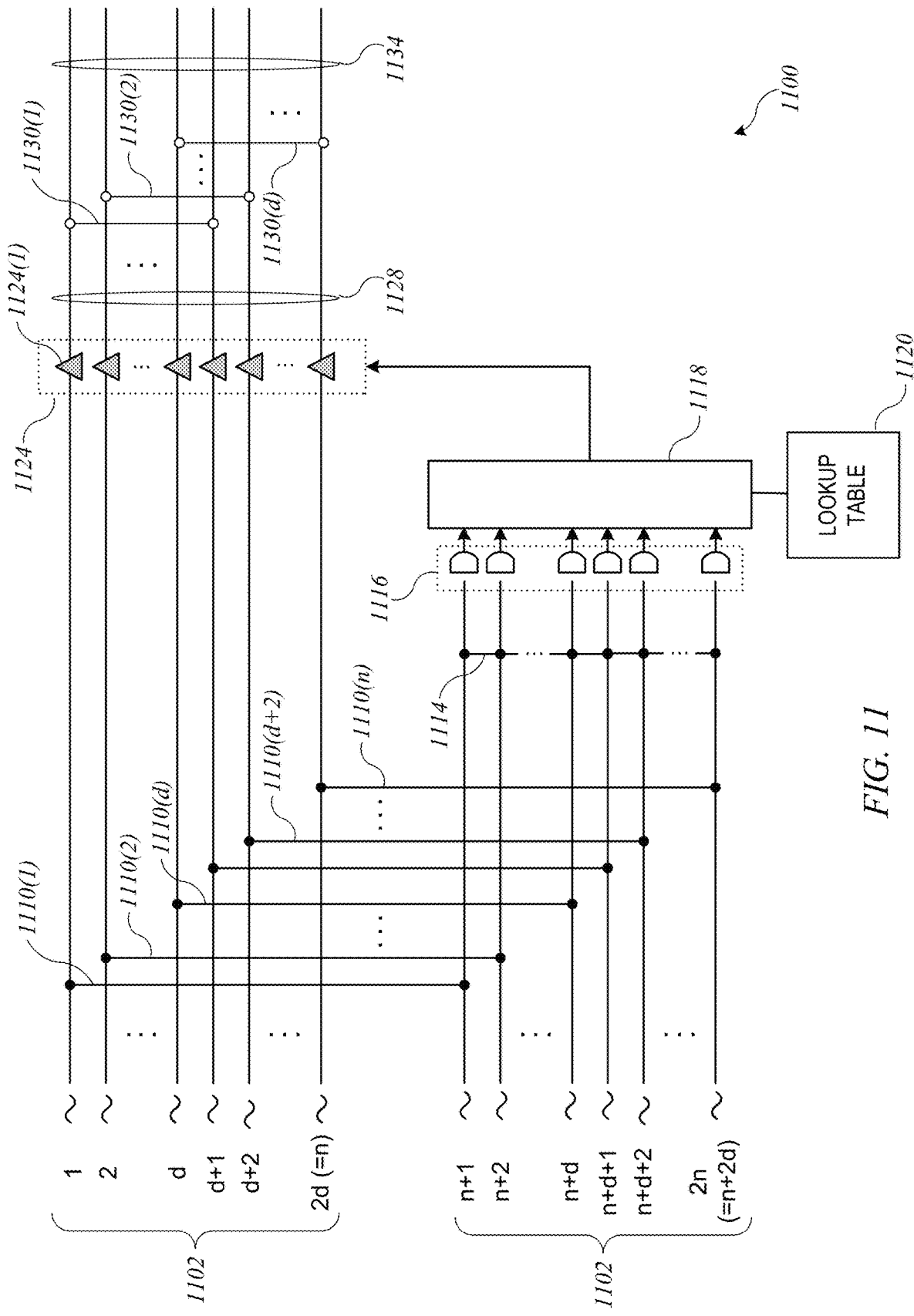
FIG. 11 shows a simplified circuit diagram of a linear optic circuit that can generate maximally-entangled qudit pairs according to some embodiments.

FIG. 11 shows a simplified circuit diagram of a linear optic circuit 1100 that can generate maximally-entangled qudit-pair states $|I_d\rangle$ according to some embodiments. FIG. 11 uses a total of 2n (=4d) modes 1102. Each mode 1102 can be implemented as a waveguide. A first group of modes 1102(1)-1102(n) can be "signal" modes that produce the entangled qudit pair, while a second group of modes 1102(n+1)-1102(2n) can be heralding modes. In this example, each of the 2n modes 1102(1)-1102(2n) is initially occupied by a photon (indicated by a wavy line). For example, one or more photon sources of the kind described in section 1.3 above can be used to generate photons that are propagated onto modes 1102(1)-1102(2n).

A first-order mode coupling (e.g., implementing transfer matrix T of Eq. (9)) is performed on pairs of modes as shown by mode couplers 1110(1)-1110(n). Each of mode couplers 1110(1)-1110(n) couples one of the signal modes 1102(1)-1102(n) with one of the heralding modes 1102(n+1)-1102(2n). For example, each of mode couplers 1110(1)-1110(n) can be implemented using a 50/50 beam splitter. A mode-information erasure (MIE) coupling (e.g., implementing an n-mode mode spreading transform similar to that shown in FIG. 5) is performed on the n heralding modes 1102(n+1)-1102(2n), as shown by MIE coupler 1114. MIE coupler 1114 can be described as being positioned downstream of mode couplers 1110(1)-1110(n), meaning that MIE coupler 1114 operates on a particular mode only after the relevant one of mode couplers 1110(1)-1110(n) has operated on that mode. As described above, an MIE circuit can be any circuit having the property that if the input is a single photon localized in one input mode, the circuit delocalizes the photon amongst each of a number of output modes such that the photon has equal probability of being detected in any one of the output modes. For instance, in embodiments where n is a power of 2, MIE coupler 1114 can implement a Hadamard transfer matrix; other implementations, such as a discrete Fourier transform (DFT), can also be used.

The outputs of MIE coupler 1114 can be measured and used to determine whether a qudit pair is successfully generated on the n signal modes 1102(1)-1102(n). For instance, detectors 1116 can be a set of n photon-counting detectors, each of which is coupled to one of heralding modes 1102(n+1)-1102(2n) downstream of MIE coupler 1114 (as with other uses of "downstream" herein, detector 1116 operates on a particular mode after MIE coupler 1114 has finished operating on that mode). Each detector 1116 can output a classical data signal (e.g., a voltage level or sequence of voltage levels on a conductor) indicating the number of photons detected. Classical data signals output by detectors 1116 can be coupled to classical control logic 1118 (also referred to herein as "decision logic"), which can be implemented as a digital logic circuit with an arrangement of classical logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). In some embodiments, detectors 1116 are coupled to an off-chip classical computer having a processor and a memory, and the off-chip classical computer is programmed to perform some or all of the operations of classical control logic 1118. In some embodiments, classical control logic 1118 (which can include an off-chip classical computer) receives information from each detector 1116 indicating whether that detector 1116 detected a photon (and optionally how many). Stated another way, control logic 1118 receives the detection pattern for a detection operation from detectors 1116 (e.g., in the form of analog detection signals or digital detection signals depending on the implementation of detectors 1116). Control logic 1118 executes logic that determines the total number of photons detected by detectors 1116 and, based on the total number of photons detected, whether a qudit pair was successfully generated on signal modes 1102(1)-1102(n). For example, control logic 1118 can be configured such that a qudit pair is confirmed (also referred to as "success" of the qudit pair generator) if and only if a total of 2n−2 photons are detected by detectors 1116, leaving 2 photons propagating on modes 1102(1)-1102(n). In some embodiments, control logic 1118 can determine success or failure of qudit pair generation directly from the detection pattern, without computing the total number of photos detected.

In instances where a total of 2n−2 photons are detected by detectors 1116, it can be inferred that the resulting state on signal modes 1102(1)-1102(n) is:

$$|\phi'_n\rangle = \frac{1}{\sqrt{2n}} \sum_{i=1}^{n} e^{i\varphi_i(\vec{m})} (\hat{a}_i^\dagger)^2 |vac\rangle \quad (21)$$

where $\varphi_i(\vec{m})$ are phases that depend on the particular distribution of the 2n−2 photons across detectors 1116. Thus, state $|\phi'_n\rangle$ differs from state $|\phi_n\rangle$ of Eq. (17) only in the relative phases of the modes.

Accordingly, some embodiments of qudit pair generator 1300 can apply a variable phase correction. For example, phase shifters 1124 can be a set of n reconfigurable phase shifters (one phase shifter for each mode) that can apply a phase shift to each of modes 1102(1)-1102(n). The amount of phase shift can be controlled by classical control logic 1118. For example, a lookup table 1120 can store a list of the possible distributions of 2n−2 photons across detectors 1116 (i.e., the number of photons in each detector), with each possible distribution being associated with a set of n phase shifts to be applied by phase shifters 1124. In response to determining that 2n−2 photons were detected by detectors 1116, classical decision logic circuit 1118 can determine the specific distribution of the 2n−2 photons across detectors 1116 and can use lookup table 1120 to determine the corresponding set of phase shifts to be applied by phase shifters 1124. Classical control logic 1118 can generate control signals to configure each of phase shifters 1124 to apply the appropriate phase shift. Specific examples of determining phase shifts based on photon distribution are described below.

After operation of phase shifters 1124 (at point 1128), the qudit pair exists in a state $|\phi_n\rangle$. To obtain a maximally entangled state $|I_d\rangle$, an additional set of mode couplers 1130(1)-1130(d) can be used. Each of mode couplers 1130(1)-1130(d) couples one of modes 1102(1)-1102(d) (associated with the first qudit) to one of modes 1102(d+1) to 1102(2d) (associated with the second qudit). In some embodiments, mode couplers 1130(1)-1130(d) can implement the following transfer matrix:

$$T = \frac{1}{\sqrt{2}} \begin{pmatrix} e^{-i\pi/4} & e^{i\pi/4} \\ e^{i\pi/4} & e^{-i\pi/4} \end{pmatrix}. \quad (22)$$

The resulting state at output point 1134 can be a state $|I_d\rangle$ as defined in Eq. (19) and (20).

As noted above, phase shifters 1124 can be controlled to provide a particular phase shift based on the distribution of photons detected by detectors 1116. The phase shifts can also depend on the particular transfer matrix implemented by MIE coupler 1114. For purposes of illustration, it is assumed that MIE coupler 1114 implements a DFT with $\omega = e^{2\pi i/n}$. The DFT can be expressed as an n×n matrix F whose components are given by:

$$F_{i,j} = \frac{\omega^{(i-1)(j-1)}}{\sqrt{n}}, i, j = 1, \ldots, n. \quad (23)$$

A detection pattern obtained from detectors 1116 can be represented as an n-component vector $\vec{m}$ whose components represent the number of photons in the corresponding one of the n detectors 1116. For example, in an embodiment where n=4, $\vec{m}=(3, 1, 1, 1)$ represents a six-photon event on four modes, with three photons in the first detector and one photon in each of the second, third, and fourth detectors. A set of n-component vectors $\vec{p}(k)$ are defined as having components:

$$p_i(k) = \begin{cases} 0, & i = k \\ 2, & i \neq k \end{cases}, \quad (24)$$

where i=1, ..., n and k=1, ..., n. For each value of k, a matrix $F[\vec{m}|\vec{p}(k)]$ is defined by taking $m_i$ times the ith row and $p_j(k)$ times the jth column of F for all i, j. The corrective phases $\varphi_k$ can be computed as:

$$\varphi_k = -\arg(-\text{per } F[\vec{m}|\vec{p}(k)]), \quad (25)$$

where "per" is the matrix permanent and "arg" is the phase (or argument). In some embodiments, phase shifter 1124(k) can apply the phase shift $\varphi_k$.

For some applications, only the relative phase of the output modes is significant. Accordingly, in some embodiments, the phase of one of the modes is not shifted. For instance, phase shifter 1124(1) operating on mode 1102(1) can be omitted, so that the set of phase shifters 1124 includes n−1 phase shifters rather than n phase shifters. In that case, the corrective phases computed according to Eq. (25) can be converted to relative phases:

$$\varphi'_k = \varphi_k - \varphi_1. \quad (26)$$

Other techniques for computing the corrective phases can also be used. It should be understood that in embodiments where MIE coupler 1114 implements a transfer matrix other than a DFT, a similar computation can be performed starting from an appropriate input matrix.

Given a fixed number of modes n, there are a finite number of distributions of 2n−2 photons across n detectors. Accordingly, the corrective phases can be computed in advance for each possible distribution (e.g., using Eq. (25) or Eq. (26)) and stored in lookup table 1120, indexed by the pattern of photon detection (vector $\vec{m}$). Alternatively, if desired, corrective phases can be computed in real time.

In some embodiments, the operation of qudit pair generator circuit 1100 can be non-deterministic; that is, inputting 2n photons as shown does not guarantee that a maximally entangled qudit pair state will be created on modes 1102(1)-1102(n). For instance, in some implementations the probability of success (assuming 2n photons are input) is $n/2^n$.

Figure 12:
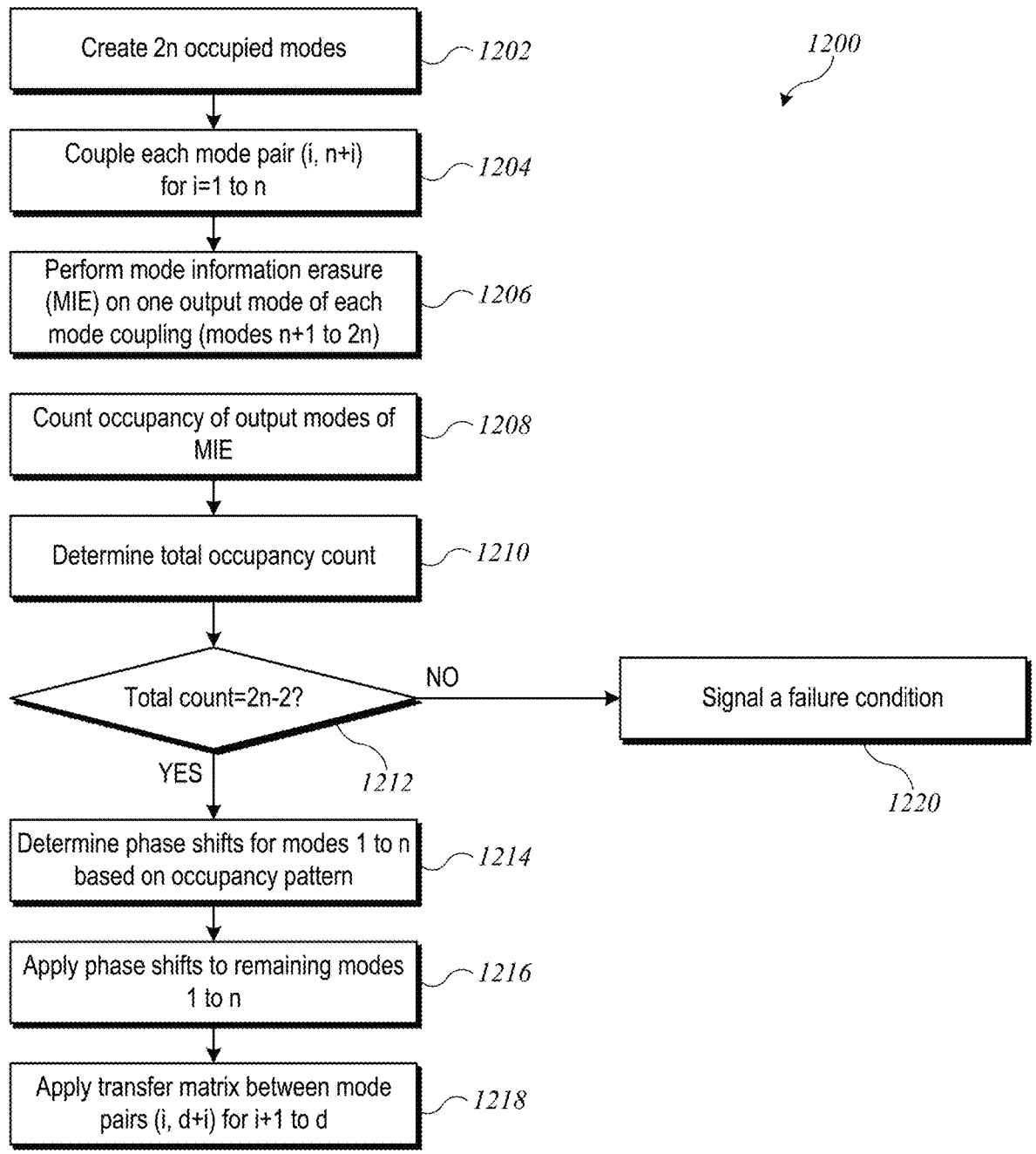
FIG. 12 shows a flow diagram showing operation of a qudit pair generation process according to some embodiments.

Generation of entangled qudit pairs can be implemented in a variety of physical systems. FIG. 12 shows a flow diagram of a qudit pair generation process 1200 according to some embodiments. Process 1200 can be implemented in any system that supports an appropriate number of modes. One example of such a system is circuit 1100 described above. Other photonic circuits or systems can be substituted. Process 1200 can also be implemented using other types of quantum systems, such as ion traps.

At block 1202, a set of 2n (=4d) occupied modes are created. For example in circuit 1100 of FIG. 11, a photon can be generated and propagated on each of modes 1102. At block 1204, a mode coupling can be applied between each pair of modes i and n+i, for i=1 to n. In some embodiments, each mode coupling can be a 50/50 beam splitter as described above, or other component implementing mode couplers 1110(1)-1110(n) of FIG. 11. At block 1206, mode information erasure is performed on one output mode of each mode coupling (the heralding modes). For example, MIE coupler 1114 can be applied. At block 1208, occupancy of each output mode of the MIE operation can be counted. For example, as described above, detectors 1116 can be used to count photons in each of modes 1102(n+1)-1102(2n) after application of MIE coupler 1114. At block 1210, a total occupancy count can be determined. For example, classical control logic 1118 can receive a photon count from each of detectors 1116 and can add the counts to determine a total occupancy count.

At block 1212, a determination can be made as to whether the total occupancy count is equal to 2n−2. If so, then qudit pair generation is successful. (As noted above, in some embodiments the determination of success or failure can be based on the detection pattern rather than the total occupancy count, in which case block 1210 can be omitted.) At block 1214, phase shifts can be determined for each of the modes that were not subject to occupancy counting. For example, as described above, classical control logic 1118 can use lookup table 1120 to determine a phase shift for each mode based on the particular pattern of occupied heralding modes. At block 1216, the phase shifts can be applied to the signal modes, e.g., using phase shifters 1124. At block 1218, an additional transfer matrix (e.g., a combination of mode couplings and fixed phase shifts) can be applied between pairs of signal modes to produce an output state, which can be a maximally entangled qudit pair state.

If, at block 1212, the total occupancy count is not equal to 2n−2, then at block 1220, a failure condition can be signaled. For example, classical control logic 1118 can generate a binary output signal indicating either success ("Yes" decision at block 1210) or failure ("No" decision at block 1210). In various embodiments, the binary output signal can be provided to a central controller of a quantum computing system (or other system that uses qudit pairs generated according to process 1200).

Process 1200 can be implemented in a variety of physical systems, including but not limited to circuit 1100 of FIG. 11 or similar circuits. Circuit 1100 can be implemented using an integrated photonic system employing waveguides, beam splitters, photonic switches, and single photon detectors, with the modes that can be occupied by photons being spatiotemporal modes that correspond to presence of a photon in a waveguide. Modes can be coupled using mode couplers, e.g., optical beam splitters, to implement transformation operations, and measurement operations can be implemented by coupling single-photon detectors to specific waveguides. One of ordinary skill in the art with access to this disclosure will appreciate that modes defined by any appropriate set of degrees of freedom, e.g., polarization modes, temporal modes, and the like, can be used without departing from the scope of the present disclosure. For instance, for modes that only differ in polarization (e.g., horizontal (H) and vertical (V)), a mode coupler can be any optical element that coherently rotates polarization, e.g., a birefringent material such as a waveplate. For other systems such as ion trap systems or neutral atom systems, a mode coupler can be any physical mechanism that can couple two modes, e.g., a pulsed electromagnetic field that is tuned to couple two internal states of the atom/ion. Phase shifts may depend on the particular physical system in which process 1200 is implemented.

The dimensionality d of the qudit state space can be as large as desired. In some embodiments, the qudit state space can be two-dimensional (d=2), in which case the qudits are qubits, and circuit 1100 or similar circuits can generate a pair of qubits in a Bell state. The resulting circuit can be similar to the Bell state generator of FIG. 7, but with potentially higher probability of success.

Figure 13:
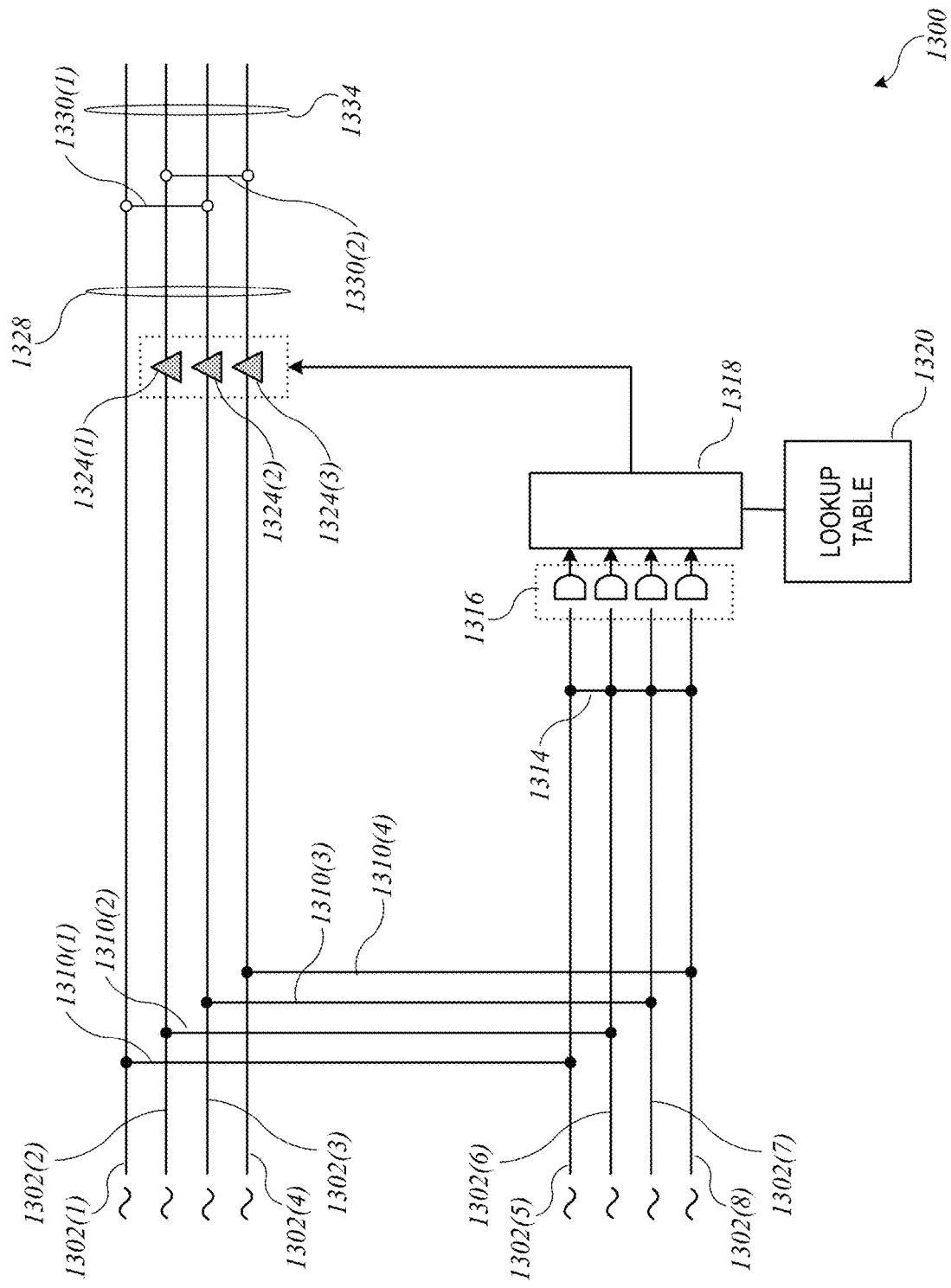
FIG. 13 shows a simplified circuit diagram of a linear optic circuit that can generate qubit pairs in a Bell state according to some embodiments.

FIG. 13 shows a simplified circuit diagram of a linear optic circuit 1300 that can generate qubit pairs in a Bell state according to some embodiments. Circuit 1300 is similar to circuit 1100 described above, except that in this instance, the design choice is made that d=2. Circuit 1300 includes eight input modes 1302, each of which can be implemented as a waveguide. A first group of modes 1302(1)-1302(4) can be signal modes that provide a Bell pair at the output 1334, while a second group of modes 1302(5)-1302(8) can be heralding modes. Circuit 1300 is configured to receive a photon on each of the eight input modes 1302. (In contrast, Bell state generator circuit 700 of FIG. 7 receives photons on four of the input modes.) Each of mode couplers 1310(1)-1310(4) couples one of the signal modes 1302(1)-1302(4) to one of the heralding modes 1302(5)-1302(8). A mode-information erasure (MIE) coupling (e.g., implementing a 4-mode mode spreading transform as shown in FIG. 5) is performed on the four heralding modes 1302(5)-1302(8), as shown by MIE coupler 1314.

The outputs of MIE coupler 1314 can be measured and used to determine whether a Bell pair is successfully generated on the four signal modes 1302(1)-1302(4). For instance, detectors 1316 can be a set of four photon-counting detectors, each of which is coupled to one of heralding modes 1302(5)-1302(8) after MIE coupler 1314. Each detector 1316 can output a classical data signal (e.g., a voltage level or sequence of voltage levels on a conductor) indicating the number of photons detected. Classical data signals output by detectors 1316 can be coupled to classical control logic 1318, which can be implemented similarly to classical control logic 1118 described above. For instance, control logic 1318 can receive the detection pattern for a detection operation from detectors 1316, determine the total number of photons detected by detectors 1318, and further determine, based on the total number of photons detected, whether a Bell pair was successfully generated on signal modes 1302(1)-1302(4). In some embodiments, control logic 1318 can be configured such that success is found if and only if a total of 6 (2n−2 where n=8) photons are detected by detectors 1316.

Reconfigurable (or variable) phase shifters 1324(1)-1324(3) can be used to perform phase corrections dependent on the particular pattern of photons detected by detectors 1316. For instance, a lookup table 1320 can store a list of the possible distributions of six photons across four detectors 1316, and classical control logic 1318 can use the pattern of photons detected by detectors 1316 and lookup table 1320 to determine the appropriate set of phase shifts to be applied by phase shifters 1324(1)-1324(3). In this example, three reconfigurable phase shifters 1324(1)-1324(3) are used to correct the phases of modes 1302(2)-1302(4) relative to the phase of 1302(1) (e.g., as described above with reference to Eq. (26)). In some embodiments, a variable phase shifter can also be applied to mode 1302(1). Mode couplers 1330(1) and 1330(2) can implement the transfer matrix of Eq. (22).

Detectors 1316 provide 84 possible detection patterns that include exactly six photons, and in some embodiments, lookup table 1320 can include 84 entries, one for each detection pattern. In some embodiments, further simplification may be possible. For example, in embodiments where mode couplers 1310(1)-1310(4) and 1330(1)-1330(2) implement transfer matrices corresponding to Eqs. (15) and (9), respectively, and MIE coupler 1314 implements a real 4×4 Hadamard transfer matrix, the corrective phase shift for each output mode can be either $e^{i\pi/2}$ or 1 (corresponding to no shift). Where this is the case, each of reconfigurable phase shifters 1324(1)-1324(3) can have just two states: an "on" state that applies a phase shift of $e^{i\pi/2}$ and an "off" state that applies a phase shift of 1 (e.g., has no effect). In addition, rather than storing 84 patterns, the size of lookup table 1320 can be reduced. For example, if $m_i$ is the number of photons detected by the ith one of detectors 1316, the following variables can be defined:

$$b_1 = m_1 + m_2$$
$$b_2 = m_1 + m_3$$
$$b_3 = m_1 + m_4 \quad (27)$$

It can be shown that the settings ("on" or "off") for reconfigurable phase shifters 1324(1)-1324(3) depend only on whether $b_1$, $b_2$, and $b_3$ are odd or even. FIG. 14 shows an example of a lookup table 1400 according to some embodiments. Lookup table 1400, which can be used to implement lookup table 1320 of FIG. 13, maps the pattern of $b_1$, $b_2$, and $b_3$ to settings for the variable phase shifters, where $\Delta 1$ is the setting for phase shifter 1324(1) (applied to mode 1302(2)), $\Delta 2$ is the setting for phase shifter 1324(2) (applied to mode 1302(3)), and $\Delta 3$ is the setting for phase shifter 1324(3) (applied to mode 1302(4)). It should be understood that different lookup tables can be used, depending on the particular transfer matrices applied, and the computation of Eq. (25) or similar computations can be used to determine phase corrections.

Like circuit 1100, operation of Bell state generator circuit 1300 can be non-deterministic; that is, inputting eight photons as shown does not guarantee that a maximally entangled qudit pair state will be created on modes 1302(1)-1302(4). In some implementations the probability of success with eight input photons is 1/4, which is higher than the 3/16 probability of success for the Bell state generator of FIG. 7. In some embodiments additional techniques can be applied to further boost the probability of success.

3. Additional Embodiments

Described above are examples of circuits and techniques that can be used to generate a maximally entangled qudit pair. Those skilled in the art with access to the present disclosure will recognize that other implementations and embodiments can also be constructed. The number of modes and the particular arrangement and physical construction of circuit components described herein can be modified as desired. Circuits of the kind described herein can be used in conjunction with any type of single photon sources and/or detectors. Classical control logic can be implemented on-chip with the waveguides, beam splitters, and other circuit components or off-chip as desired. Further, the techniques described herein for generating a maximally entangled qudit pair can be adapted to qudits implemented using other types of physical systems, not limited to photons.

It should be understood that all numerical values used herein are for purposes of illustration and may be varied. In some instances ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added. In some instances, one circuit component may be described as being "downstream" or "upstream" of another circuit component. Such references should be understood as meaning that the components are arranged such that the "downstream" circuit component does not operate on a particular mode until after the "upstream" circuit component has completed any operations involving that mode; components may be arranged and reordered as desired provided that the upstream/downstream order of operations on a particular mode is preserved.

This disclosure provides a description of the claimed invention with reference to specific embodiments. Those skilled in the art with access to this disclosure will appreciate that the embodiments are not exhaustive of the scope of the claimed invention, which extends to all variations, modifications, and equivalents.

What is claimed is:

1. A circuit comprising:
   a first set of waveguides and a second set of waveguides, wherein each of the first set of waveguides and the second set of waveguides includes a number n=2d of waveguides;
   a first set of mode couplers, wherein each mode coupler in the first set is coupled between one of the waveguides in the first set of waveguides and one of the waveguides in the second set of waveguides;
   a mode information erasure (MIE) circuit coupled to the waveguides of the second set of waveguides downstream of the first set of mode couplers;
   a set of n photon detectors coupled to outputs of the MIE circuit, each of the n photon detectors being configured to count a number of detected photons;
   a set of reconfigurable phase shifters, each reconfigurable phase shifter coupled to a different one of the waveguides in the first set of waveguides;
   a second set of mode couplers, wherein each mode coupler in the second set is coupled between a different pair of waveguides in the first set of waveguides downstream of the reconfigurable phase shifters; and
   a classical control logic circuit coupled to outputs of set of n photon detectors and configured to determine, based on a total count of photons counted by the n photon detectors, whether generation of a qudit pair succeeded or failed and further configured to determine, based on a pattern of photons counted by each of the n photon detectors, a phase shift configuration for each of the reconfigurable phase shifters.

2. The circuit of claim 1 further comprising:
   a photon source configured to propagate a single photon into each of the waveguides in the first set of waveguides and the second set of waveguides.

3. The circuit of claim 1 wherein the MIE circuit includes a network of beam splitters configured to apply a Hadamard transfer matrix.

4. The circuit of claim 1 wherein the MIE circuit includes a network of beam splitters configured to apply a discrete Fourier transform.

5. The circuit of claim 1 wherein each of the mode couplers in the first set of mode couplers comprises a 50/50 beam splitter.

6. The circuit of claim 1 wherein each of the mode couplers in the second set of mode couplers comprises a 50/50 beam splitter.

7. The circuit of claim 1 wherein, in the event that the classical control logic circuit determines that generation of a qudit pair succeeded, outputs of the second set of mode couplers correspond to an entangled pair of qudits encoding d bits of information.

8. The circuit of claim 1 wherein the set of reconfigurable phase shifters includes n reconfigurable phase shifters.

9. The circuit of claim 1 wherein the set of reconfigurable phase shifters includes n−1 reconfigurable phase shifters.

10. A circuit comprising:
    a first set of four waveguides and a second set of four waveguides;
    a first set of mode couplers, wherein each mode coupler in the first set is coupled between one of the waveguides in the first set of waveguides and one of the waveguides in the second set of waveguides;
    a mode information erasure (MIE) circuit coupled to the waveguides of the second set of waveguides and operating after the first set of mode couplers;
    a set of photon detectors coupled to outputs of the mode information erasure circuit, each of the photon detectors being configured to count a number of detected photons;
    a set of reconfigurable phase shifters, each reconfigurable phase shifter coupled to a different one of the waveguides in the first set of waveguides; and
    a classical control logic circuit coupled to outputs of set of photon detectors and configured to determine, based on a total count of photons counted by the photon detectors, whether generation of a Bell pair succeeded or failed and further configured to determine, based on a pattern of photons counted by each of the photon detectors, a phase shift configuration for each of the reconfigurable phase shifters.

11. The circuit of claim 10 further comprising a second set of mode couplers, wherein each mode coupler in the second set is coupled between a different pair of waveguides in the first set of waveguides downstream of the reconfigurable phase shifters.

12. The circuit of claim 10 wherein each of the reconfigurable phase shifters has a first state that applies a phase shift and a second state that applies no phase shift.

13. The circuit of claim 12 wherein the phase shift applied in the first state is $e^{i\pi/2}$.

14. The circuit of claim 12 wherein the classical control logic circuit is further configured to determine the state for each of the reconfigurable phase shifters based on sums of photon counts across different subsets of the detectors.

15. The circuit of claim 14 wherein the classical control logic circuit is further configured to determine the state for each of the reconfigurable phase shifters based on evenness or oddness of the sums.

* * * * *